(12) United States Patent
Iwasaki et al.

(10) Patent No.: US 7,976,209 B2
(45) Date of Patent: Jul. 12, 2011

(54) PLANAR LIGHTING DEVICE

(75) Inventors: Osamu Iwasaki, Kanagawa (JP);
Ryuichi Katsumoto, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 353 days.

(21) Appl. No.: 12/239,785

(22) Filed: Sep. 28, 2008

(65) Prior Publication Data
US 2009/0086505 A1 Apr. 2, 2009

(30) Foreign Application Priority Data
Sep. 28, 2007 (JP) ................... 2007-256648

(51) Int. Cl.
*F21V 7/04* (2006.01)
(52) U.S. Cl. .................. 362/628; 362/612; 362/624
(58) Field of Classification Search .................. 362/612, 362/613, 615, 616, 623, 624, 625, 627, 628
See application file for complete search history.

(56) References Cited

U.S. PATENT DOCUMENTS

| | | | | |
|---|---|---|---|---|
| 5,899,552 | A * | 5/1999 | Yokoyama et al. | ........... 362/613 |
| 5,966,192 | A | 10/1999 | Higuchi et al. | |
| 5,993,020 | A | 11/1999 | Koike | |
| 6,217,184 | B1 | 4/2001 | Koike et al. | |
| 7,244,059 | B2 * | 7/2007 | Onishi | ........... 362/628 |
| 7,826,703 | B2 * | 11/2010 | Iwasaki | ........... 362/616 |
| 2003/0210222 | A1 | 11/2003 | Ogiwara et al. | |
| 2004/0080924 | A1 * | 4/2004 | Chuang | ........... 362/612 |
| 2004/0124764 | A1 | 7/2004 | Suzuki et al. | |
| 2007/0133935 | A1 | 6/2007 | Fine | |

FOREIGN PATENT DOCUMENTS

| | | |
|---|---|---|
| JP | 07-036037 | 2/1995 |
| JP | 08-248233 | 9/1996 |
| JP | 08-271739 | 10/1996 |
| JP | 11-153963 | 6/1999 |
| JP | 2003-090919 A | 3/2003 |
| JP | 2004-171948 A | 6/2004 |
| JP | 2005-108676 A | 4/2005 |
| JP | 2005-302322 A | 10/2005 |
| WO | 2006/031545 A1 | 3/2006 |
| WO | 2007/020966 A1 | 2/2007 |

OTHER PUBLICATIONS

EP Communication, dated Feb. 5, 2009, issued in EP Application No. 08017059.0, 8 pages.
Okumura et al., "Optical design of liquid crystal display blacklighting with highly scattering optical transmission polymer," Journal of Optics A: Pure and Applied Optics, vol. 5, No. 5, Aug. 22, 2003, S269-S275.

* cited by examiner

*Primary Examiner* — Y My Quach Lee
(74) *Attorney, Agent, or Firm* — Sughrue Mion, PLLC

(57) ABSTRACT

The planar lighting device includes, in addition to light sources, a light exit plane, a pair of light entrance planes formed on a pair of sides of the light exit plane, and a rear plane composed of a pair of inclined planes formed on a side opposite from the light exit plane such that the light guide plate grows thicker with an increasing distance from the light entrance planes toward the center. The light guide plate contains light scattering particles satisfying $Npi > Np$, where $Npi$ is the particle density in a region of space within a given range of the light guide plate and $Np$ the density in the other region of space. The planar lighting device with minimized brightness unevenness liable to develop near the light entrance planes when the light exit plane has great dimensions.

6 Claims, 11 Drawing Sheets

PLANAR LIGHTING DEVICE

The entire contents of literature cited in this specification are incorporated herein by reference.

BACKGROUND OF THE INVENTION

The present invention relates to a planar lighting device used for indoor and outdoor illumination and comprising light sources and a light guide plate for admitting light emitted by the light sources and emitting the light through the light exit plane thereof or to a planar lighting device used as a backlight for illuminating the liquid crystal display panel of a liquid crystal display device or as a backlight used for advertising panels, advertising towers, advertising signs, and the like.

Liquid crystal display devices use a backlight unit for illuminating the liquid crystal display panel from the rear side thereof. A backlight unit is configured using optical members comprising a light guide plate for diffusing light emitted by an illuminating light source to irradiate the liquid crystal display panel, a prism sheet, and a diffusion sheet.

Currently, large liquid crystal display televisions predominantly use a so-called direct illumination type backlight unit having no light guide plate but comprising optical members such as a diffusion plate disposed immediately above the illuminating light source. This type of backlight unit comprises cold cathode tubes serving as a light source provided on the rear side of the liquid crystal display panel whereas the inside of the backlight unit provides white reflection surfaces to secure uniform light amount distribution and a necessary brightness.

To achieve a uniform light amount distribution with the direct illumination type backlight unit, however, the backlight unit needs to have a given thickness, say about 30 mm, in a direction perpendicular to the liquid crystal display panel. While demands of still thinner backlight units are expected to grow in the future, achieving a further reduced thickness of say 10 mm or less with a backlight unit is deemed difficult in view of uneven light amount distribution expected to accompany the direct illumination type.

Among backlight units that allow reduction of thickness thereof is a backlight unit using a light guide plate whereby light emitted by illumination light sources and admitted into the light guide plate is guided in given directions and emitted through a light exit plane, which is a different plane from the plane through which light is admitted.

There has been proposed a backlight of a type described above using a light guide plate formed by mixing scattering particles for diffusing light into a transparent resin, for which reference may be had, for example, to JP 07-36037 A, JP 08-248233 A, JP 08-271739 A, and JP 11-153963 A.

JP 07-36037 A, for example, discloses a light-diffusion light-guide light source device comprising a light-diffusion light guide member having at least one light entrance plane region and at least one light exit plane region and light source means for admitting light through the light entrance plane region, the light-diffusion light guide member having a region that has a tendency to decrease in thickness with the increasing distance from the light entrance plane.

JP 08-248233 A discloses a planar light source device comprising a light-diffusion light guide member, a prism sheet provided on the side of the light-diffusion light guide member closer to a light exit plane, and a reflector provided on the rear side of the light-diffusion light guide member. JP 08-271739 A discloses a liquid crystal display comprising a light emission direction correcting element formed of sheet optical materials provided with a light entrance plane having a repeated undulate pattern of prism arrays and a light exit plane given a light diffusing property. JP 11-153963 A discloses a light source device comprising therein a light-diffusion light guide member having a light scattering property and light supply means for supplying light through an end plane of the light-diffusion light guide member.

In the planar lighting devices provided with a light-diffusion light guide plate containing light scatterers mixed therein as disclosed in the above prior art literature, light emitted by the light source and admitted through the light entrance plane into the light-diffusion light guide member receives a single or a multiple scattering effect at a given rate as the light propagates through the inside of the light-diffusion light guide member. Moreover, a significant proportion of light that reaches both end planes of the diffusion light guide member or a surface of the reflector receives reflection effect and is returned back into the diffusion light guide member.

The above composite process produces light beam that is emitted through the light exit plane highly efficiently with a directivity to travel obliquely forward as viewed from the light source. Briefly, light radiated by the light source is emitted through the light exit plane of the light-diffusion light guide member.

Thus, the prior art literature mentioned above purportedly states that a light guide plate containing scattering particles mixed therein is capable of emitting uniform light with a high light emission efficiency.

As regards the light guide plate used in the planar lighting device, there have been disclosed a light guide plate in the form of a flat plate and a light guide plate composed of a portion shaped to have a region with a tendency to grow thinner with the increasing distance from the light entrance plane attached to the other portion, in addition to the light guide plate mentioned above that is shaped to have a region with a tendency to grow thinner with the increasing distance from the light entrance plane.

SUMMARY OF THE INVENTION

To achieve increased dimensions with a planar lighting device using any of the light guide plates disclosed in the above prior art literature, light needs to travel a longer distance from the light source, which in turn requires the light guide plate itself to be made thicker. Thus, the planar lighting device remain to have an unsolved problem of achieving reduction in thickness and weight.

Further, the shape having a tendency to decrease in thickness with the increasing distance from a position at which light from the light source is admitted or the flat plate shape as disclosed in the prior art literature mentioned above also pose a problem that a limited distance that light is capable of traveling limits the extent to which the dimensions of the planar lighting device can be increased.

While use of a light source having large light emission faces and hence providing more light to the light guide plate would enable emission of light with an increased brightness or an increased illuminance through the light exit plane, that approach is accompanied by a problem that there is a limit to the dimensions of the light emission face of the light source that can be used depending on the configuration of the light guide plate. Besides, use of a larger light source or a light source providing a greater amount of light would increase the manufacturing costs of the device and power consumption thereof.

JP 2003-90919A, JP 2004-171948 A, JP2005-108676 A, and JP 2005-302322 A each propose light guide plates, some having the shape of a reversed wedge and others having a bulged shape with respect to the direction in which light enters the light guide plate. The light guide plates of these types all have small dimensions and are designed to achieve stabler manufacturing or suppress uneven brightness (light amount) using multiple reflection. The light guide plates of these types, made of transparent resin, allow light to leak through the light entrance planes unless provided with prisms or dot patterns.

Also proposed is a method whereby the light guide plate is provided with a reflection member near its light entrance planes to cause a multiple reflection of light such that the light leaking from the light entrance planes reenters the light guide plate, as will be described. This method, however, requires complicated means and therefore not only adds to the weight of a light guide plate when the light guide plate or its light exit plane is adapted to have large dimensions but increases manufacturing costs (JP 2004-171948 A, JP2005-108676 A, and JP 2005-302322 A). Further, light from the light sources is perceived as uneven brightness near the light entrance planes.

A light guide plate having the shape of a reversed wedge, when adapted to have a large light exit plane without changing its thickness, necessarily has a small taper angle formed by its rear planes (inclination angle), which makes it difficult for light admitted through the light entrance planes to reach deep into the light guide plate (toward the opposite light entrance plane). Thus, the density of scattering particles kneaded and dispersed in the light guide plate for scattering light needs to be reduced increasingly as the dimensions of the light guide plate increase.

Then, the density of the scattering particles near the light entrance planes decrease even though the light use efficiency may be maintained. Accordingly, the extent to which light is scattered decreases, which tends to cause uneven brightness near the light entrance planes.

Thus, an object of the invention is to provide a planar lighting device solving the problems associated with the prior art described above and limiting the occurrence of brightness unevenness near the light entrance planes to provide improved illumination even when the light guide plate has a large light exit plane.

To achieve the above objects, the present invention provides a planar lighting device comprising a light guide plate including a light exit plane, a pair of first light entrance planes respectively formed on a pair of sides of the light exit plane, a pair of lateral planes respectively formed on the other pair of sides of the light exit plane, and a rear plane composed of a pair of inclined planes formed on a side opposite from the light exit plane and inclined such that a thickness of the light guide plate in a direction perpendicular to the light exit plane increases with an increasing distance from the pair of light entrance planes, respectively, and joining each other in a middle between the pair of first light entrance planes; and a pair of main light sources for emitting light to the pair of light entrance planes of the light guide plate, respectively, the pair of main light sources being disposed respectively opposite to the pair of light entrance planes; wherein the light guide plate is formed by kneading and therein dispersing scattering particles for scattering light so as to satisfy $N_{pi} > N_p$, where $N_{pi}$ is a first density of the scattering particles in a first region of space within a given range of the light guide plate from the pair of first light entrance planes toward a center of the light guide plate and $N_p$ is a second density of the scattering particles in the other region of space in the light guide plate.

Preferably, the first density of the scattering particles $N_{pi}$ is in a range of $0.02$ wt % $< N_{pi} < 0.25$ wt %.

Preferably, the first region of space $L_{npi}$ to which the first density of the scattering particles $N_{pi}$ is applied lies in a range of region of $5$ mm $< L_{npi} < 20$ mm from each of the pair of first light entrance planes toward the center of the light guide plate.

Preferably, the planar lighting device further comprises reflection members, each provided so as to cover each of regions of the light exit plane within a given range from each of the pair of first light entrance planes toward the center of the light guide plate, for reflecting light admitted through the pair of first light entrance planes and leaking through the regions of the light exit plane covered by the reflection members back into the light guide plate, wherein the first region of space $L_{npi}$ satisfies a relationship $L_{npi} < L_r < L_e$, where $L_r$ is a length of each of the reflection members in the direction in which light is admitted, and $L_e$ is a width of a frame of an upper housing provided in such a manner as to cover a periphery of the light exit plane of the light guide plate on four sides thereof.

Preferably, each of the pair of main light sources comprises a support member and plural light sources arrayed respectively on the support member in a longitudinal direction of the pair of first light entrance planes, wherein each of the plural light sources forming each of the pair of main light sources is an LED chips.

Preferably, the pair of lateral planes is a pair of second light entrance planes, and the planar lighting device further comprises a pair of auxiliary light sources respectively disposed adjacent the pair of second light entrance planes, for emitting light allowed to admit through the pair of second light entrance planes, respectively.

Preferably, each of the pair of auxiliary light sources comprises a support member and plural light sources arrayed respectively on the support member in a longitudinal direction of the pair of second light entrance planes, wherein each of the plural light sources forming each of the pair of the auxiliary light sources is an LED chips.

According to the invention, the light emitted through the light exit plane can be adapted to provide an illuminance distribution representing a bell-curve or a high-in-the-middle curve by adjusting the optical axis of each of the auxiliary light sources. Thus, a planar lighting device that can be not only suitably used for liquid crystal display devices such as a liquid crystal television but also adapted to provide a larger screen for liquid crystal display devices such as a liquid crystal television.

Further, the density with which light is emitted by the light sources to the light entrance planes can be evened out throughout the length of each of the light sources from the center toward both ends thereof by adjusting the array density of the light sources in addition to the adjustment of the optical axes of the light sources.

BRIEF DESCRIPTION OF THE DRAWINGS

These and other objects, features, and advantages of the present invention will be apparent from the following detailed description and accompanying drawings in which.

DETAILED DESCRIPTION OF THE INVENTION

Now, the planar lighting device of the invention will be described in detail below referring to preferred embodiments illustrated in the accompanying drawings.

A first embodiment of the invention will be described first.

Figure 1:
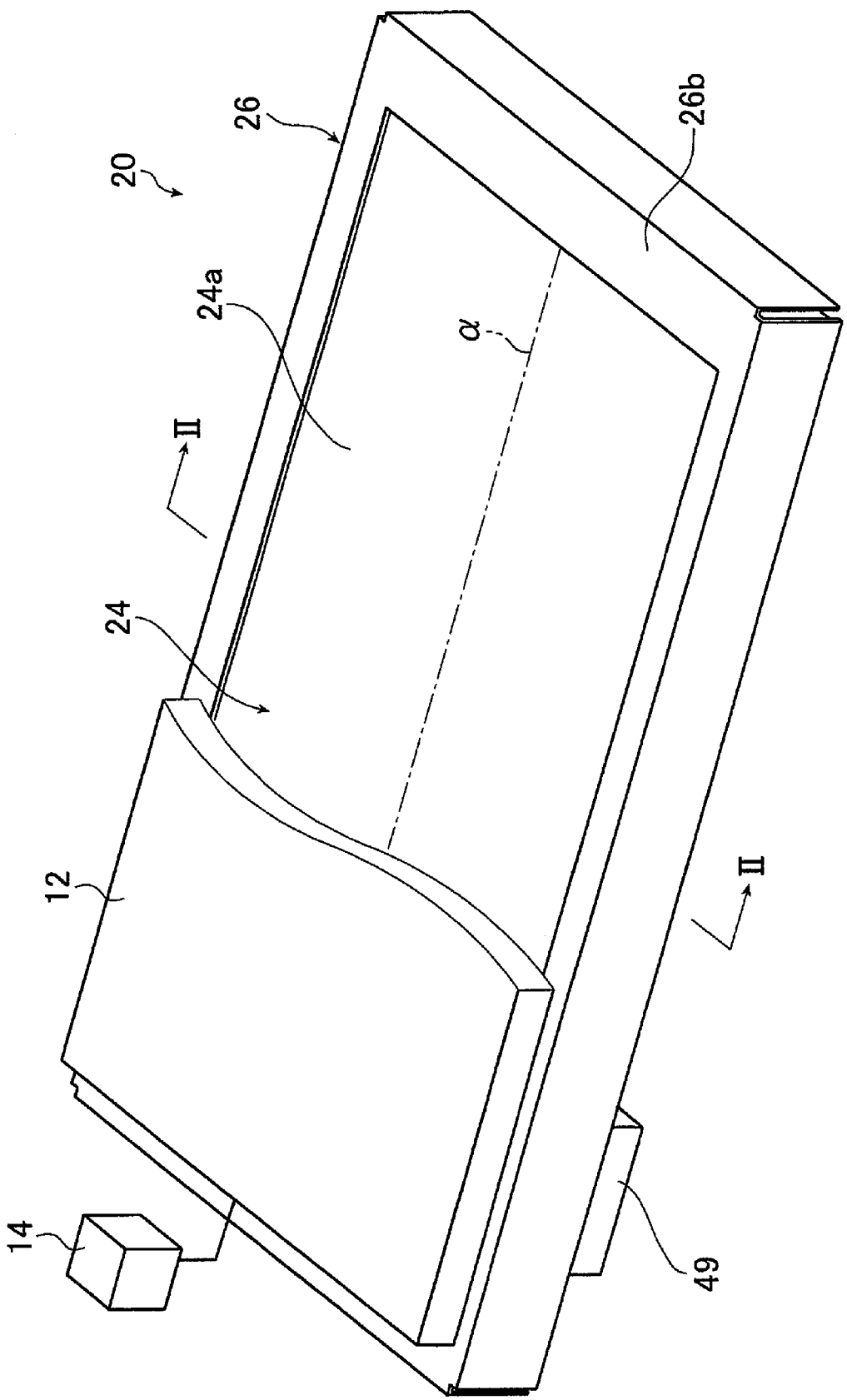
FIG. 1 is a schematic perspective view illustrating an embodiment of a liquid crystal display device using the planar lighting device of the invention.
Figure 2:
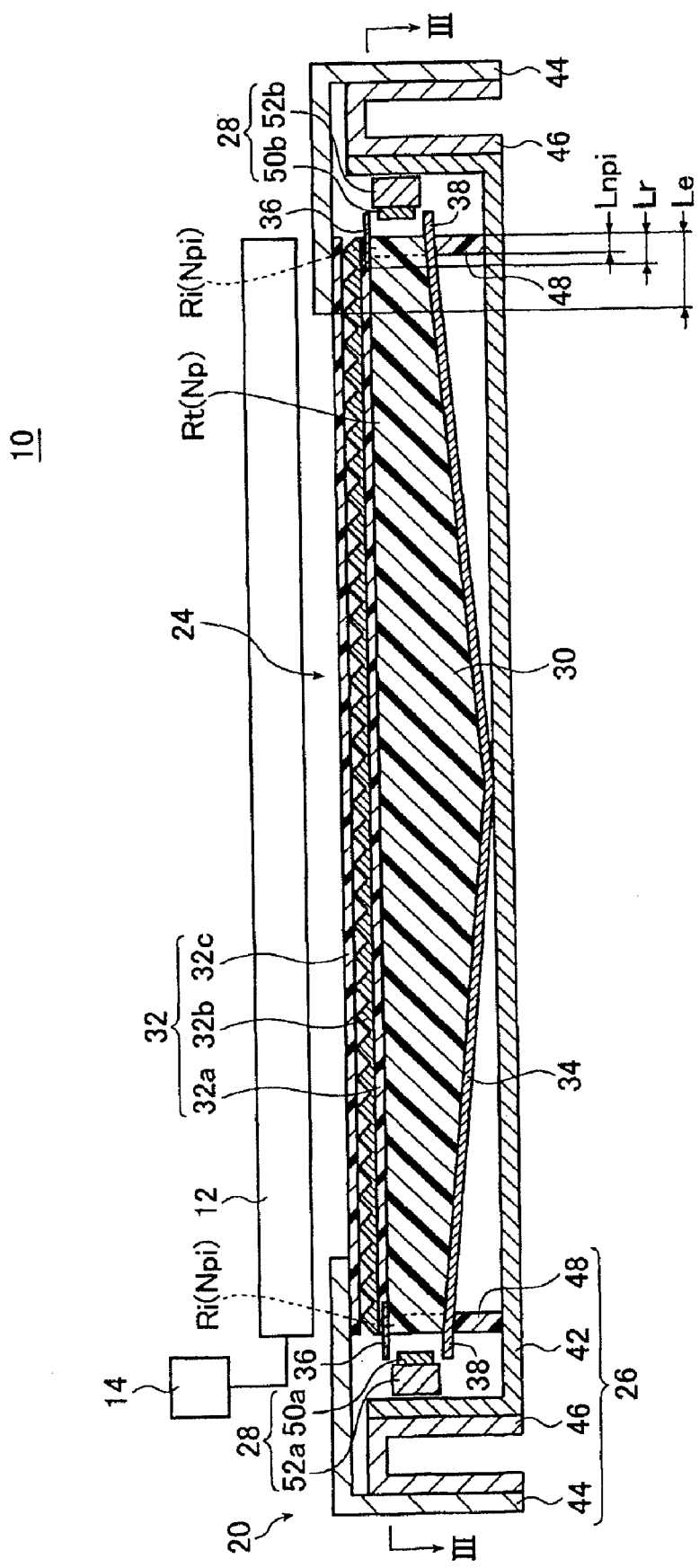
FIG. 2 is a cross sectional view of the liquid crystal display device illustrated in FIG. 1 taken along line II-II.

FIG. 1 is a schematic perspective view illustrating a liquid crystal display device provided with the planar lighting device of the invention; FIG. 2 is a cross sectional view of the liquid crystal display device illustrated in FIG. 1 taken along line II-II.

FIG. 3A is a view of the planar lighting device (also referred to as "backlight unit" below) illustrated in FIG. 2 taken along line III-III; FIG. 3B is a cross sectional view of FIG. 3A taken along line B-B.

A liquid crystal display device 10 comprises a backlight unit 20, a liquid crystal display panel 12 disposed on the side of the backlight unit closer to the light exit plane, and a drive unit 14 for driving the liquid crystal display panel 12. In FIG. 1, part of the liquid crystal display panel 12 is not shown to better illustrate the configuration of the planar lighting device.

In the liquid crystal display panel 12, electric field is partially applied to liquid crystal molecules, previously arranged in a given direction, to change the orientation of the molecules. The resultant changes in refractive index in the liquid crystal cells are used to display characters, figures, images, etc., on the liquid crystal display panel 12.

The drive unit 14 applies a voltage to transparent electrodes in the liquid crystal display panel 12 to change the orientation of the liquid crystal molecules, thereby controlling the transmittance of the light transmitted through the liquid crystal display panel 12.

The backlight unit 20 is a lighting device for illuminating the whole surface of the liquid crystal display panel 12 from behind the liquid crystal display panel 12 and comprises a light exit plane having substantially the same shape as the image display surface of the liquid crystal display panel 12.

As illustrated in FIGS. 1, 2, 3A and 3B, the first embodiment of the backlight unit 20 comprises a main body of the lighting device 24 and a housing 26. The main body of the lighting device 24 comprises two main light sources 28, a light guide plate 30, and an optical member unit 32. The housing 26 comprises a lower housing 42, an upper housing 44, turnup members 46, and support members 48. As illustrated in FIG. 1, a power unit casing 49 is provided on the underside of the lower housing 42 of the housing 26 to hold power supply units that supply the main light sources 28 with electrical power.

Now, components that make up the backlight unit 20 will be described.

The main body of the lighting device 24 comprises the main light sources 28 for emitting light, the light guide plate 30 for admitting the light emitted by the main light sources 28 to produce planar light, and the optical member unit 32 for scattering and diffusing the light produced by the light guide plate 30 to obtain light with further reduced unevenness.

First, the main light sources 28 will be described.

Figure 4:
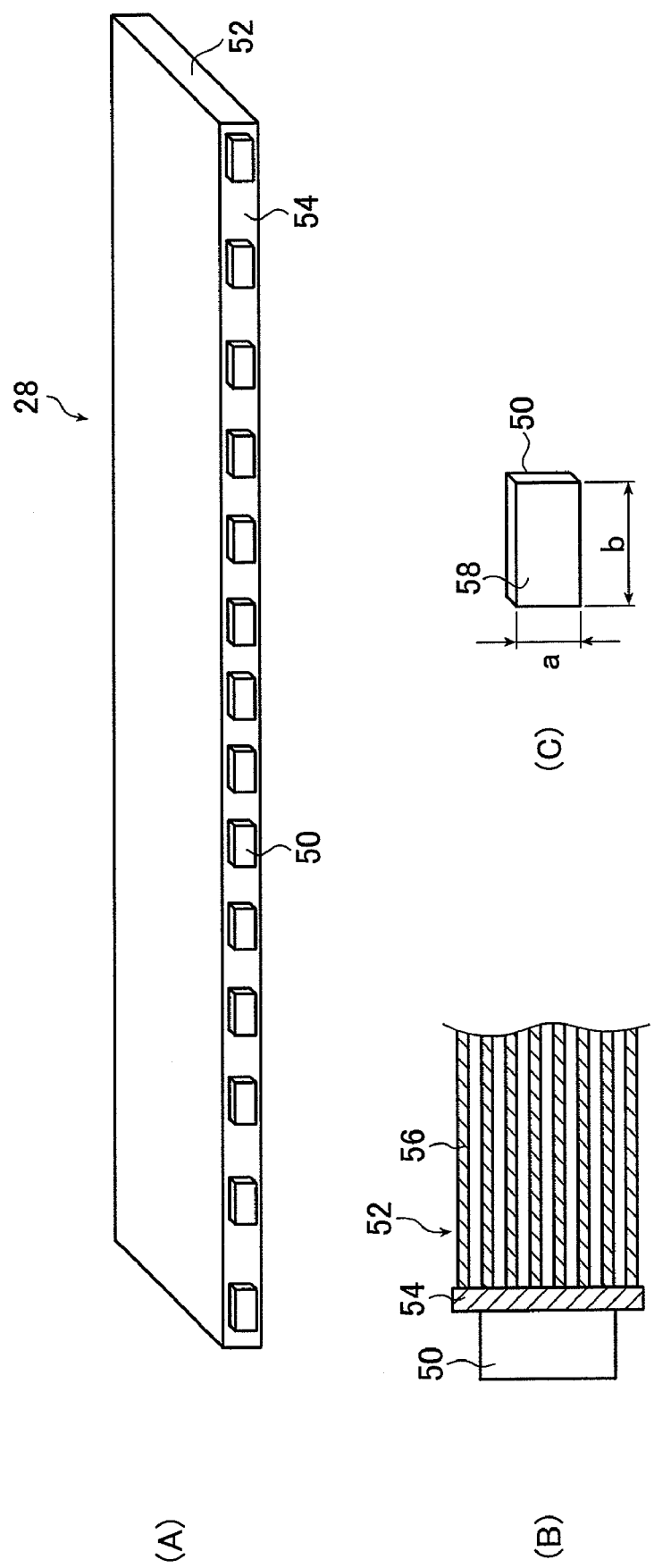
FIG. 4A is a perspective view schematically illustrating a configuration of the light source used for the planar lighting device of FIGS. 1 and 2.
FIG. 4B is a cross sectional view of the light source illustrated in FIG. 4A.
FIG. 4C is a schematic perspective view illustrating one LED of the light source of FIG. 4A as enlarged.

FIG. 4A is a perspective view schematically illustrating a configuration of the main light sources 28 of the planar lighting device 20 of FIGS. 1 and 2; FIG. 4B is a cross sectional view of the main light source 28 illustrated in FIG. 4A; and FIG. 4C is a schematic perspective view illustrating only one LED of the main light source 28 of FIG. 4A as enlarged.

As illustrated in FIG. 4A, each of the main light sources 28 comprises light emitting diode chips (referred to as "LED chips" below) 50 and a light source mount 52 for carrying LED chips 50 (support member carrying arrayed LED chips 50).

The LED chip 50 is a chip of a light emitting diode emitting blue light the surface of which has a fluorescent substance applied thereon. It has a light emission face 58 having a given area, through which white light is emitted.

Specifically, when blue light emitted through the surface of the light emitting diode of the LED chip 50 is transmitted through the fluorescent substance, the fluorescent substance generates fluorescence. Thus, when blue light emitted by the LED chip 50 is transmitted through the fluorescent substance, the blue light emitted by the light emitting diode and the light radiated as the fluorescent substance generates fluorescence blend to produce and emit white light.

The LED chip 50 may for example be formed by applying a YAG (yttrium aluminum garnet) base fluorescent substance to the surface of a GaN base light emitting diode, an InGaN base light emitting diode, etc.

As illustrated in FIG. 4B, the light source mount 52 comprises an array base 54 and fins 56. The LED chips 50 described above are arranged in a single row on the array base 54 at given intervals depending on where they are located. Specifically, the LED chips 50 constituting the main light source 28 are arrayed along the length of a first light entrance plane 30d or a second light entrance plane 30e of a light guide plate 30 to be described, that is, parallel to a line in which the first light entrance plane 30d or the second light entrance plane 30e meets with a light exit plane 30a and secured to the array base 54.

The array base 54 is a plate member disposed such that one surface thereof faces the corresponding one of the lateral end faces of the light guide plate 30, where the light guide plate 30 is thinnest, i.e., the first light entrance plane 30d or the second light entrance plane 30e. The LED chips 50 are carried on a lateral plane of the array bases 54 facing the respective light entrance planes 30d and 30e of the light guide plate 30.

The array base 54 according to the embodiment under discussion is formed of a metal having a good heat conductance as exemplified by copper and aluminum. The array base 54 also acts as a heat sink to absorb heat generated by the LED chips 50 and releases the heat to the outside.

The fins 56 are plate members each formed of a metal having a good heat conductance as exemplified by copper and aluminum. The fins 56 are connected to the array base 54 on the side thereof opposite from the LED chips 50 and spaced a given distance from neighboring fins 56.

A plurality of fins 56 provided in the light source mount 52 secure a large surface area and a high heat dissipation efficiency, increasing the efficiency with which the LED chips 50 are cooled.

The heat sink may be not only of air-cooled type but also of water-cooled type.

While the embodiment under discussion uses the array base 54 of the light source mount 52 as heat sink, a plate member without a heat-releasing function may be used to form the array base in place of the array base having a function of a heat sink, where the LED chips need not be cooled.

As illustrated in FIG. 4C, the LED chips 50 of the embodiment under discussion each have a rectangular shape such that the sides perpendicular to the direction in which the LED chips 50 are arrayed are shorter than the sides lying in the direction in which the LED chips 50 are arrayed or, in other words, the sides lying in the direction of thickness of the light guide plate 30 to be described, i.e., the direction perpendicular to the light exit plane 30a, are the shorter sides. Expressed otherwise, the LED chips 50 each have a shape defined by b>a where "a" denotes the length of the sides perpendicular to the light exit plane 30a of the light guide plate 30 and "b" denotes the length of the sides in the array direction. Now, let "q" be the distance by which the arrayed LED chips 50 are spaced apart from each other, then q>b holds. Thus, the length "a" of the sides of the LED chips 50 perpendicular to the light exit plane 30a of the light guide plate 30, the length "b" of the sides in the array direction, and the distance "q" by which the arrayed LED chips 50 are spaced apart from each other preferably have a relationship satisfying q>b>a.

Providing the LED chips 50 each having the shape of a rectangle allows a thinner design of the light source to be achieved while producing a large amount of light. A thinner light source, in turn, enables a thinner design of the planar lighting device to be achieved. Further, the number of LED chips that need to be arranged may be reduced.

While the LED chips 50 each preferably have a rectangular shape with the shorter sides lying in the direction of the thickness of the light guide plate 30 for a thinner design of the light source, the present invention is not limited thereto, allowing the LED chips to have any shape as appropriate such as a square, a circle, a polygon, and an ellipse.

While the LED chips are arranged in a single row to form a monolayered structure in the embodiment under discussion, the present invention is not limited thereto; the light source may use multilayered LED arrays of LED chips 50 arranged on the array base 54. When stacking the LEDs in this manner, more LED arrays can be stacked when the LED chips 50 are each adapted to have a rectangular shape and a reduced thickness. Where the LED arrays are stacked to form a multilayer structure, that is to say, where more LED arrays (LED chips) are packed into a given space, a larger amount of light can be generated. Preferably, the above inequality also applies to the distance separating the LED chips of one LED array from the LED chips of the other LED arrays in adjacent layers. Expressed otherwise, the LED arrays preferably are stacked such that the LED chips are spaced a given distance apart from the LED chips of the LED arrays in adjacent layers.

According to the invention, an optimum planar lighting device may be provided by varying the array density of the LED chips in a direction in which the LED chips are arrayed.

Specifically, according to the invention, LED chips 50a and 50b of the main light sources 28 are arrayed at an array density that varies depending on their position along the length of the first light entrance plane 30d and the second light entrance plane 30e opposite which the LED chips 50a and 50b are disposed.

The LED chips 50a and 50b are arrayed such that the array density is highest in an area opposite the center in the lengthwise direction of the first light entrance plane 30d and the second light entrance plane 30e and decreases with the increasing distance from the center.

The array density is preferably so determined as to provide a high-in-the-middle, bell-curve illuminance distribution as measured along a bisector α of the light guide plate 30. To find such a desired illuminance distribution, one may for example use a calculation based on a sequential iteration method or any other appropriate known method.

Thus, obtained is a bell-curve distribution of illuminance where the illuminance is highest in the central area of the light guide plate 30 or in the position "0" on the horizontal axis, decreasing down the periphery.

According to the invention, the illuminance of the light emitted through the light exit plane 30a can be formed into a bell-curve distribution, i.e., a distribution where the illuminance gradually increases toward the center by disposing the LED chips 50 such that the array density of the LED chips located opposite the central area of the light entrance plane is higher than the array density of the LED chips located at the periphery. When the light emitted through the light exit plane exhibits a bell-curve illuminance distribution and provides highest illuminance in the central area of the light entrance plane, difference in illuminance between the central area and the periphery appears to be evened out by visual observation such that uniform light appears to be emitted through the light exit plane. Thus, the planar lighting device of the invention is capable of emitting light with an illuminance distribution that is suitable for use in liquid crystal televisions and the like. Accordingly, since a large light exit plane is achieved, a large display area can be secured for liquid crystal televisions and the like by using the inventive planar lighting device.

Further, since the LED chips 50 are so arranged that the LED chips away from the center of the main light source 28 in the array direction may be reduced in number, the manufacturing costs can be reduced and so can power consumption as well.

Now, the light guide plate 30 will be described.

Figure 5:
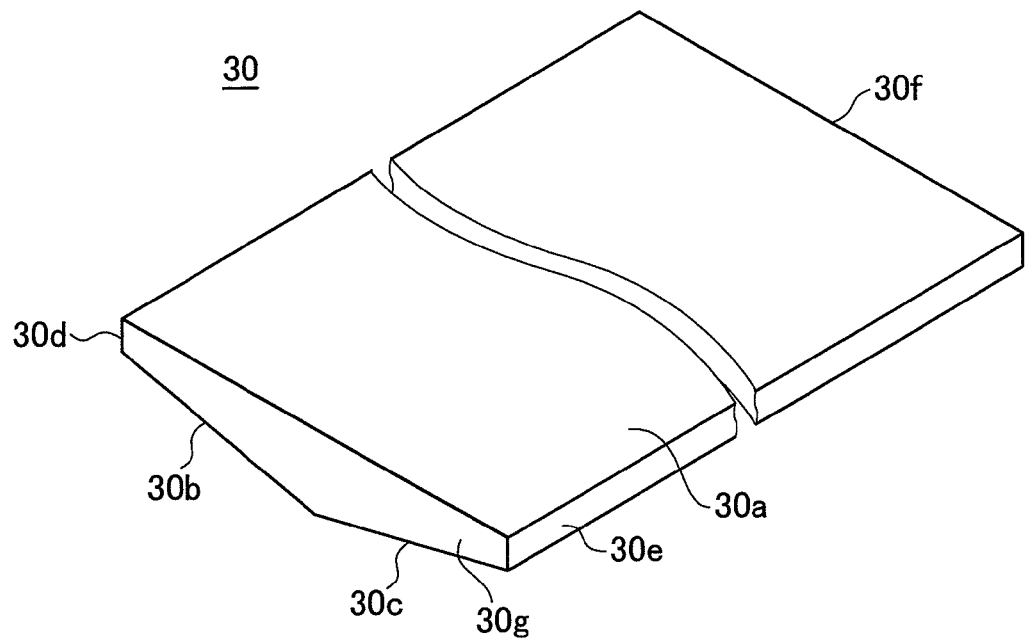
FIG. 5 is a schematic perspective view illustrating a shape of the inventive light guide plate.

FIG. 5 is a perspective view schematically illustrating the configuration of the light guide plate 30.

Figure 3:
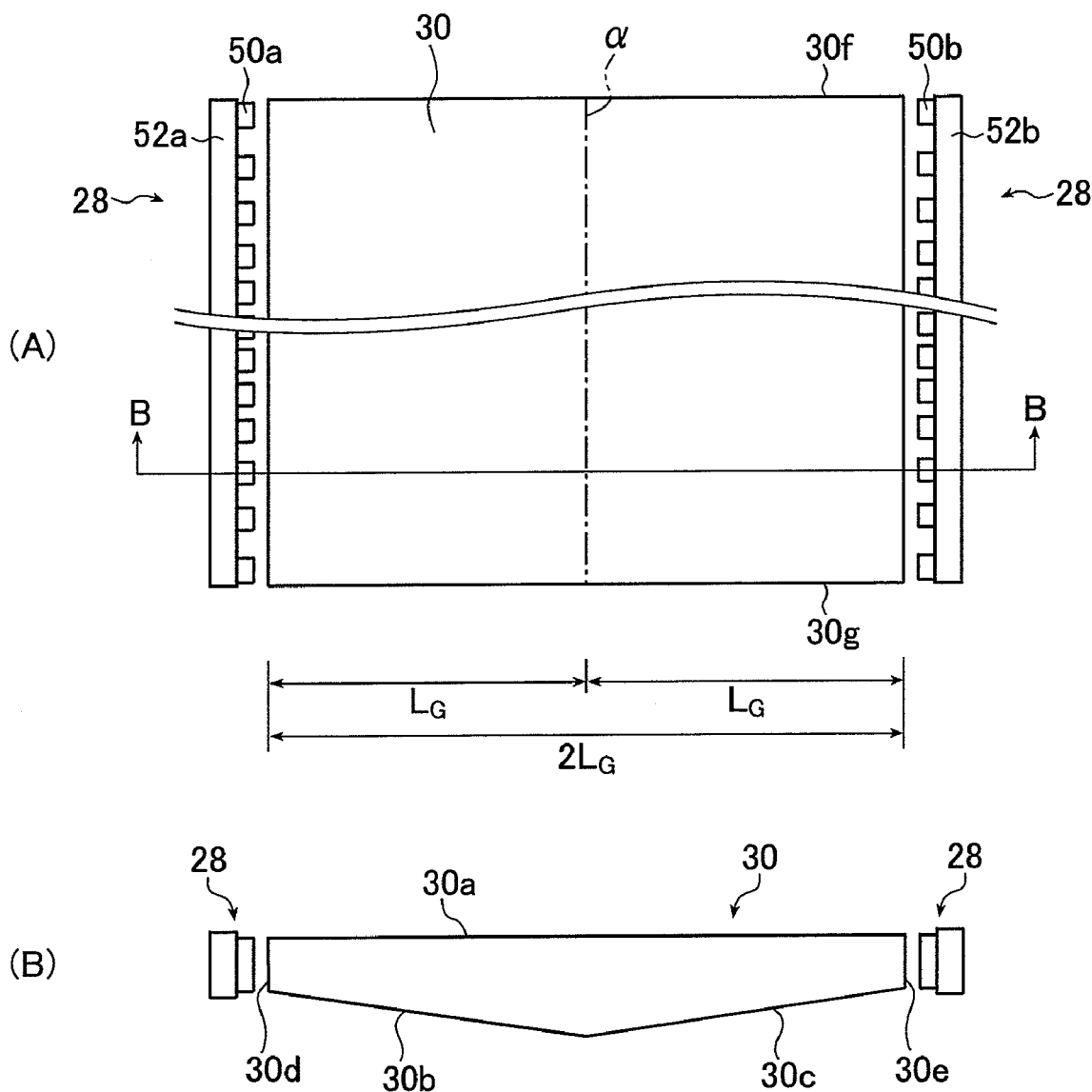
FIG. 3A is a view of an example of the planar lighting device illustrated in FIG. 2 taken along line III-III.
FIG. 3B is a cross sectional view of FIG. 3A taken along line B-B.

As illustrated in FIGS. 2, 3, and 5, the light guide plate 30 comprises the light exit plane 30a, which is flat and substantially rectangular; two (a pair of) opposite light entrance planes, the first light entrance plane 30d and the second light entrance plane 30e, formed on a pair of sides of the light exit plane 30a and substantially perpendicular to the light exit plane 30a; two inclined planes, a first inclined plane 30b and a second inclined plane 30c, located on the opposite side from the light exit plane 30a, i.e., on the underside of the light guide plate so as to be symmetrical to each other with respect to a central axis (joint), or the bisector α bisecting the light exit plane 30a (see FIGS. 1 and 3) in a direction parallel to the longitudinal sides of the first light entrance plane 30d and the second light entrance plane 30e, and inclined a given angle with respect to the light exit plane 30a; and two opposite lateral planes, a first lateral plane 30f and a second lateral plane 30g, each provided substantially vertically opposite the other two sides of the light exit plane 30a than the sides on which the light entrance planes are formed (the two sides of the light exit plane 30a perpendicular to the lines where the light exit plane 30a and the light entrance planes 30d and 30e meet).

The first inclined plane 30b and the second inclined plane 30c are so inclined as to be distanced farther from the light exit plane 30a with the increasing distance from the first light entrance plane 30d and the second light entrance plane 30e, respectively: expressed otherwise, the thickness of the light guide plate 30 in the direction perpendicular to the light exit plane 30a increases from the first light entrance plane 30d and the second light entrance plane 30e toward the center of the light guide plate 30 (bisector α).

Thus, the light guide plate 30 is thinnest at both sides thereof, i.e., at the first light entrance plane 30d and the second light entrance plane 30e, and thickest at the center, i.e., on the bisector α, where the first inclined plane 30b and the second inclined plane 30c meet. Expressed otherwise, the light guide plate 30 has such a configuration that its thickness in the direction perpendicular to the light exit plane 30a increases with the increasing distance from the first light entrance plane 30d or the second light entrance plane 30e. The inclination angle of the first inclined plane 30b and the second inclined plane 30c with respect to the light exit plane 30a is not specifically limited.

The two main light sources 28 mentioned above are disposed opposite the first light entrance plane 30d and the second light entrance plane 30e of the light guide plate 30, respectively. Specifically, one of the main light sources 28 comprising LED chips 50a and a light source mount 52a is disposed opposite the first light entrance plane 30d and the other main light source 28 comprising LED chips 50b and a light source mount 52b is disposed opposite the second light entrance plane 30e. In the embodiment under discussion, the light emission face 58 of the LED chips 50 of the light sources 28 has substantially the same length as the first light entrance plane 30d and the second light entrance plane 30e in the direction perpendicular to the light exit plane 30a.

Thus, the planar lighting device 20 has the two major light sources 28 disposed in such a manner as to sandwich the light guide plate 30. In other words, the light guide plate 30 is placed between the two major light sources 28 arranged opposite each other with a given distance between them.

In the light guide plate 30 illustrated in FIG. 2, light entering the light guide plate 30 through the first light entrance plane 30d and the second light entrance plane 30e is scattered as it travels through the inside of the light guide plate 30 by scatterers contained inside the light guide plate 30 as will be described later in detail and, directly or after being reflected by the first inclined plane 30b and/or the second inclined plane 30c, exits through the light exit plane 30a. Some light can in the process leaks through the first inclined plane 30b and the second inclined plane 30c. However, it is then reflected by the reflection plate 34 provided on the side of the light guide plate closer to the first inclined plane 30b and the second inclined plane 30c to enter the light guide plate 30 again. The reflection plate 34 will be described later in detail.

Thus, the light guide plate shaped such that its rear planes grow thicker in the direction perpendicular to the light exit plane 30a with the increasing distance from the first light entrance plane 30d and the second light entrance plane 30e, opposite which the main light sources 28 are disposed respectively, toward the center of the light guide plate 30, allows the light admitted through the light entrance planes to travel farther from the light entrance planes and, hence, achieves a larger light exit plane. Moreover, since the light entering through the light entrance planes 30d and 30e is advantageously guided to travel a long distance, a thinner design of the light guide plate 30 is made possible.

The light guide plate 30 is formed of a transparent resin into which scattering particles are kneaded and dispersed. Transparent resin materials that may be used to form the light guide plate 30 include optically transparent resins such as PET (polyethylene terephthalate), PP (polypropylene), PC (polycarbonate), PMMA (polymethyl methacrylate), benzyl methacrylate, MS resins, and COP (cycloolefin polymer). The scattering particles kneaded and dispersed into the light guide plate 30 may be formed, for example, of TOSPEARL (trademark), silicone, silica, zirconia, or a derivative polymer. The light guide plate 30 containing the scattering particles is capable of emitting uniform illuminating light through the light exit plane with a greatly reduced level of brightness unevenness. The light guide plate 30 so formed may be manufactured using an extrusion molding method or an injection molding method.

Now, let Φ be the scattering cross section of scattering particles contained in the light guide plate 30; $L_G$ the length in the incident direction from the first light entrance plane 30d or the second light entrance plane 30e of the light guide plate 30 to a position where the thickness of the light guide plate 30 in the direction perpendicular to the light exit plane 30a is greatest, said incident direction, expressed otherwise, being the direction parallel to the direction in which light entering the light guide plate travels and perpendicular to the line in which the light exit plane and the light entrance planes, i.e., the first light entrance plane 30d or the second light entrance plane 30e, meet, said length $L_G$ being, in the embodiment under discussion, a half of the length of the light guide plate in the incident direction, which in the embodiment under discussion is the direction perpendicular to the first light entrance plane 30d of the light guide plate 30, as also referred to as "direction of the optical axis" below, or, still otherwise expressed, the length from the first light entrance plane or the second light entrance plane to the bisector α; $N_p$ the density of the scattering particles contained in the light guide plate 30, said density denoting the number of particles in unit volume; and $K_C$ a compensation coefficient. Then the value $\Phi \cdot N_p \cdot L_G \cdot K_C$ is preferably not less than 1.1 and not greater than 8.2; the compensation coefficient $K_C$ is preferably not less than 0.005 and not greater than 0.1. The light guide plate 30, containing scattering particles satisfying the above relationship, is capable of emitting uniform illumination light through the light exit plane 30a with a greatly reduced level of brightness unevenness.

When parallel rays of light are caused to enter an isotropic medium, a transmittance T is generally expressed according to the Lambert-Beer law by the following expression (1):

$$T=I/I_o=\exp(-\rho \cdot x) \qquad (1)$$

where x is a distance, $I_o$ an intensity of incident light, I an intensity of outgoing light, and ρ an attenuation constant.

The above attenuation constant ρ can be expressed using the scattering cross section of particles Φ and the number of particles $N_p$ in unit volume contained in the medium as follows:

$$\rho = \Phi \cdot N_p \quad (2)$$

Accordingly, the light extraction efficiency $E_{out}$ is expressed by the following expression (3):

$$E_{out} \propto \exp(-\Phi \cdot N_p \cdot L_G) \quad (3)$$

where $L_G$ is the length of the light guide plate in the direction parallel to the direction in which light entering the light guide plate travels from the light entrance planes of the light guide plate to the thickest position or, in the embodiment under discussion, a half of the length of the light guide plate in the direction of the optical axis.

That half length of the light guide plate in the direction of the optical axis denoted by $L_G$ is the length of the light guide plate 30 in the direction perpendicular to the light entrance planes of the light guide plate 30 from one of the light entrance planes of the light guide plate 30 to the center of the light guide plate 30.

The light extraction efficiency is a ratio of light reaching the position spaced apart from the light entrance planes 30d and 30e of the light guide plate 30 by the length $L_G$ in the direction of the optical axis to the incident light. In the case of the light guide plate 30 illustrated in FIG. 2, for example, the light extraction efficiency is a ratio of light reaching the center of the light guide plate 30 or light traveling half the length of the light guide plate 30 in the direction of the optical axis to the light admitted through the light entrance planes 30d and 30e.

The expression (3) applies to a space of limited dimensions. Introducing the compensation coefficient $K_C$ therein to correct the relationship with the expression (1), the light extraction efficiency $E_{out}$ is expressed by the following expression (4). The compensation coefficient $K_C$ is a dimensionless compensation coefficient empirically obtained where light propagates through an optical medium of limited dimensions.

$$E_{out} = \exp(-\Phi \cdot N_p \cdot L_G \cdot K_C) \quad (4)$$

According to the expression (4), when $\Phi \cdot N_p \cdot L_G \cdot K_C$ is 3.5, the light extraction efficiency $E_{out}$ is 3%. When $\Phi \cdot N_p \cdot L_G \cdot K_C$ is 4.7, the light extraction efficiency $E_{out}$ is 1%.

plate 30. When $\Phi \cdot N_p \cdot L_G \cdot K_C$ is great, light exiting through the plane opposite the light entrance plane can be reduced whereas light emitted through the light exit plane 30a can be increased. Expressed otherwise, when $\Phi \cdot N_p \cdot L_G \cdot K_C$ is great, the ratio of light emitted through the light exit plane 30a to the light incident on the light entrance planes can be increased. That ratio is also referred to as "light use efficiency" below. Specifically, a light use efficiency as high as 50% or more is achieved when $\Phi \cdot N_p \cdot L_G \cdot K_C$ is 1.1 or greater.

While light emitted through the light exit plane 30a of the light guide plate 30 increasingly exhibits illuminance unevenness as $\Phi \cdot N_p \cdot L_G \cdot K_C$ increases, the illuminance unevenness can be held to under a given, tolerable level by holding the value $\Phi \cdot N_p \cdot L_G \cdot K_C$ to 8.2 or less. Note that illuminance and brightness can be treated substantially equally. Thus, it is assumed that brightness and illuminance possess similar tendencies in the present invention.

Thus, the value $\Phi \cdot N_p \cdot L_G \cdot K_C$ of the inventive light guide plate 30 is preferably not less than 1.1 and not greater than 8.2, and more preferably not less than 2.0 and not greater than 8.0. Still more preferably, the value $\Phi \cdot N_p \cdot L_G \cdot K_C$ is not less than 3.0 and, most preferably, not less than 4.7.

The compensation coefficient $K_C$ is preferably not less than 0.005 and not greater than 0.1, thus $0.005 \leq K_C \leq 0.1$.

Now, the light guide plate 30 will be described in detail by referring to specific examples.

A computer simulation was conducted to obtain light use efficiencies for different light guide plates given different values of $\Phi \cdot N_p \cdot L_G \cdot K_C$ by varying the scattering cross section $\Phi$, the particle density $N_p$, the length $L_G$, which is a half of the length of the light guide plate in the direction of the optical axis, and the compensation coefficient $K_C$. Further, illuminance unevenness was evaluated. The illuminance unevenness (%) was defined as $[(I_{Max}-I_{Min})/I_{Ave}] \times 100$, where $I_{Max}$ was a maximum illuminance of light emitted through the light exit plane of the light guide plate, $I_{Min}$ a minimum illuminance, and $I_{Ave}$ an average illuminance.

The measurement results are shown in Table 1. In Table 1, judgments "O" indicate cases where the light use efficiency is 50% or more and the illuminance unevenness is 150% or less whereas judgments "X" indicate cases where the light use efficiency is less than 50% or the illuminance unevenness is more than 150%.

TABLE 1

| | $\Phi$ [m$^2$] | $N_p$ [pcs/m$^3$] | $L_G$ [m] | $K_C$ | $\Phi \cdot N_p \cdot L_G \cdot K_C$ | Light use efficiency [%] | Illuminance unevenness [%] | Judgment |
|---|---|---|---|---|---|---|---|---|
| Example 1 | $2.0 \times 10^{-12}$ | $2.2 \times 10^{14}$ | 0.3 | 0.03 | 3.51 | 81.6 | 84 | O |
| Example 2 | $2.0 \times 10^{-12}$ | $4.3 \times 10^{14}$ | 0.3 | 0.02 | 6.21 | 84.7 | 149 | O |
| Example 3 | $2.0 \times 10^{-12}$ | $8.6 \times 10^{14}$ | 0.1 | 0.02 | 3.86 | 82.8 | 82 | O |
| Example 4 | $1.1 \times 10^{-10}$ | $1.5 \times 10^{13}$ | 0.3 | 0.008 | 3.91 | 83.0 | 105 | O |
| Example 5 | $1.1 \times 10^{-10}$ | $2.0 \times 10^{13}$ | 0.3 | 0.007 | 4.98 | 84.3 | 142 | O |
| Example 6 | $1.1 \times 10^{-10}$ | $3.5 \times 10^{13}$ | 0.1 | 0.007 | 2.86 | 79.2 | 47 | O |
| Comparative example 1 | $2.0 \times 10^{-12}$ | $2.2 \times 10^{13}$ | 0.3 | 0.05 | 0.66 | 29.1 | 51 | X |
| Comparative example 2 | $1.1 \times 10^{-12}$ | $2.5 \times 10^{12}$ | 0.3 | 0.01 | 0.99 | 43.4 | 59 | X |
| Comparative example 3 | $4.8 \times 10^{-18}$ | $8.6 \times 10^{17}$ | 0.1 | 15.2 | 6.26 | 84.8 | 201 | X |
| Comparative example 4 | $4.8 \times 10^{-18}$ | $1.7 \times 10^{18}$ | 0.1 | 13.9 | 11.5 | 84.9 | 225 | X |

The results show that the light extraction efficiency $E_{out}$ decreases as $\Phi \cdot N_p \cdot L_G \cdot K_C$ increases. The light extraction efficiency $E_{out}$ decreases in such a manner presumably because light is scattered increasingly as it travels in the direction of the optical axis of the light guide plate 30.

Figure 6:
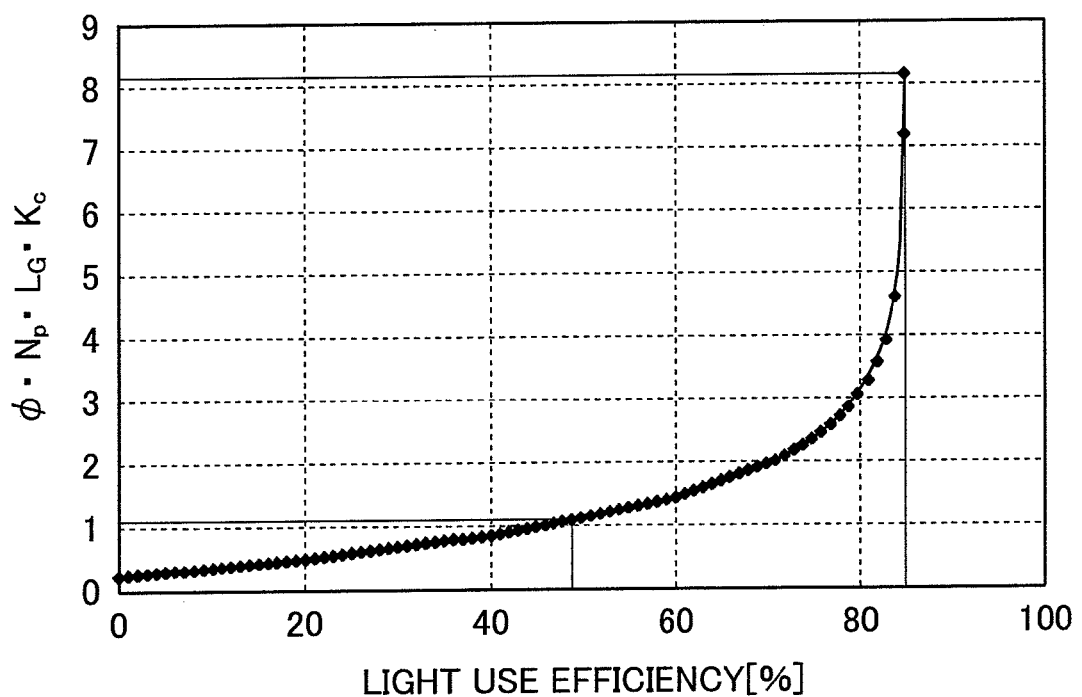
FIG. 6 is a graph illustrating measurements representing a relationship between $\Phi \cdot N_p \cdot L_G \cdot K_C$ and light use efficiency.

It follows, therefore, that the greater the value $\Phi \cdot N_p \cdot L_G \cdot K_C$ is, the more preferable it is as a property of the light guide FIG. 6 illustrates a relationship between $\Phi \cdot N_p \cdot L_G \cdot K_C$ and light use efficiency, i.e., the ratio of light emitted through the light exit plane to light admitted through the light entrance planes.

Figure 8:
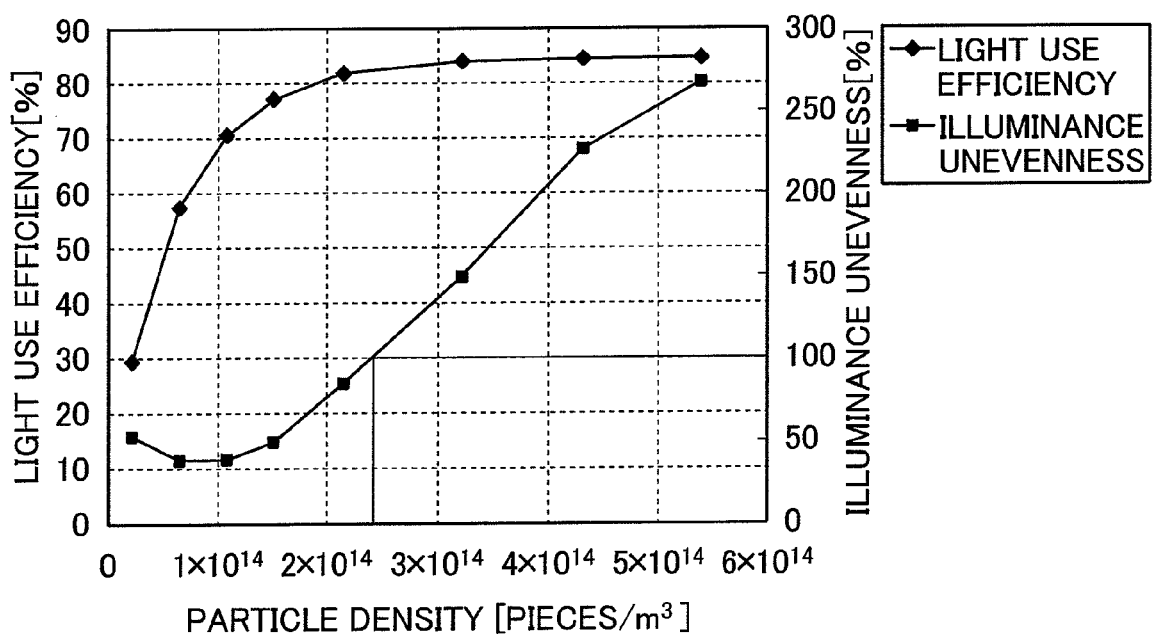
FIG. 8 is a graph illustrating relationships between light use efficiency and illuminance unevenness on the one hand and particle density on the other.

Table 1 and FIG. 8 show that given $\Phi \cdot N_p \cdot L_G \cdot K_C$ of 1.1 or more, a high light use efficiency, specifically 50% or more, is achieved whereas given $\Phi \cdot N_p \cdot L_G \cdot K_C$ of 8.2 or less, illuminance unevenness can be held to 150% or less.

It is also shown that given $K_c$ of 0.005 or more, a high light use efficiency is achieved, and given $K_c$ of 0.1 or less, illuminance unevenness observed in light emitted from the light guide plate can be minimized.

Next, light guide plates varying in particle density $N_p$ of the particles kneaded or dispersed therein were fabricated to measure brightness distributions of light emitted at different positions in the light exit plane of the individual light guide plates. In the embodiment under discussion, the conditions including scattering cross section $\Phi$, length $L_G$, which is a half of the length of the light guide plate in the direction of its optical axis, compensation coefficient $K_C$, and shape of the light guide plate, but excluding particle density $N_p$, were respectively set to fixed values as the measurements were made. In the embodiment under discussion, therefore, the value $\Phi \cdot N_p \cdot L_G \cdot K_C$ changes in proportion as the particle density $N_p$ changes.

Figure 7:
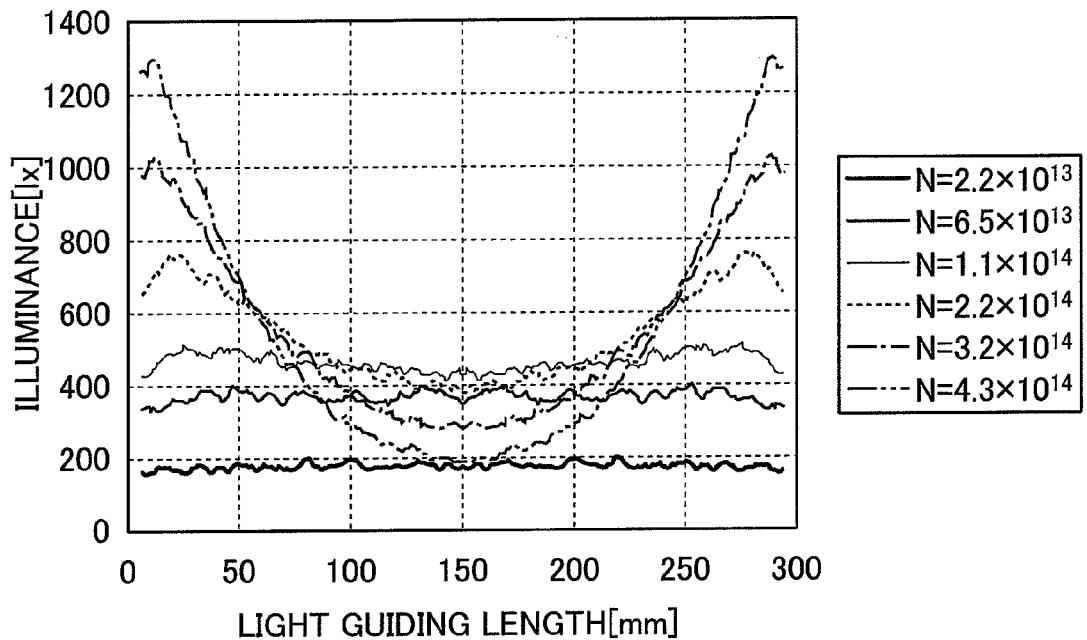
FIG. 7 is a graph illustrating measurements representing illuminances of light emitted by light guide plates each having different particle densities.

FIG. 7 shows the measurements of the distribution of illuminance observed in the light emitted through the light exit plane of the individual light guide plates having different particle densities. FIG. 7 shows the illuminance [lx] on the vertical axis plotted against a light guiding length, which is the distance [mm] from one of the light entrance planes of the light guide plate on the horizontal axis.

Illuminance unevenness was calculated from $[(I_{Max}-I_{Min})/I_{Ave}]\times 100[\%]$, where $I_{Max}$ is a maximum illuminance in the measured distribution of light emitted from areas of the light exit plane close to the lateral ends thereof, $I_{Min}$ is a minimum illuminance, and $I_{Ave}$ is an average illuminance.

Figure 10:
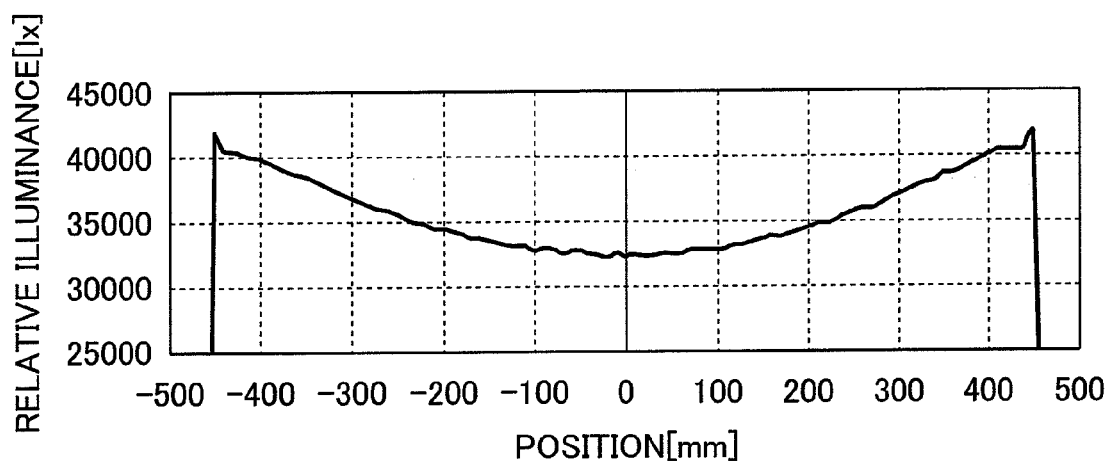
FIG. 10 is a graph illustrating a distribution of illuminance measured along the middle of the light guide plate and parallel to the light entrance planes.

FIG. 8 illustrates a relationship between the calculated illuminance unevenness and particle density. FIG. 8 shows the illuminance unevenness [%] on the vertical axis plotted against the particle density [pieces/m$^3$] on the horizontal axis. Also shown in FIG. 10 is a relationship between light use efficiency and particle density, the particle density being likewise indicated on the horizontal axis and the light use efficiency [%] on the vertical axis.

As shown in FIGS. 7 and 8, increasing the particle density or, consequently, increasing $\Phi \cdot N_p \cdot L_G \cdot K_C$, results in an enhanced light use efficiency but then illuminance unevenness also increases. The graphs also show that reducing the particle density or, consequently, reducing $\Phi \cdot N_p \cdot L_G \cdot K_C$, results in lowered light use efficiency but then illuminance unevenness decreases.

A value $\Phi \cdot N_p \cdot L_G \cdot K_C$ of not less than 1.1 and not greater than 8.2 yields a light use efficiency of 50% or more and illuminance unevenness of 150% or less. Illuminance unevenness, when reduced to 150% or less, is inconspicuous.

Thus, it will be understood that $\Phi \cdot N_p \cdot L_G \cdot K_C$ of not less than 1.1 and not greater than 8.2 yields light use efficiency above a certain level and a reduced illuminance unevenness.

Next, the optical member unit 32 will be described.

The optical member unit 32 serves to reduce the brightness unevenness of the illumination light emitted through the light exit plane 30a of the light guide plate 30 to achieve emission of light with reduced brightness unevenness through a light emission plane 24a of the main body of the lighting device 24. As illustrated in FIG. 2, the optical member unit 32 comprises a diffusion sheet 32a for diffusing the illumination light emitted through the light exit plane 30a of the light guide plate 30 to reduce brightness unevenness, a prism sheet 32b having micro prism arrays formed parallel to the lines where the light exit plane 30a and the light entrance planes 30d and 30e meet, and a diffusion sheet 32c for diffusing the illumination light emitted through the prism sheet 32b to reduce brightness unevenness.

There is no specific limitation to the diffusion sheets 32a and 32c and the prism sheet 32b; known diffusion sheets and a known prism sheet may be used. For example, use may be made of the diffusion sheets and the prism sheets disclosed in paragraphs [0028] through [0033] of JP 2005-234397 A by the Applicant of the present application.

While the optical member unit in the embodiment under discussion comprises the two diffusion sheets 32a and 32c and the prism sheet 32b between the two diffusion sheets, there is no specific limitation to the order in which the prism sheet and the diffusion sheets are arranged or the number thereof to be provided. Nor are the prism sheet and the diffusion sheets specifically limited, and use may be made of various optical members, provided that they are capable of reducing the brightness unevenness of the illumination light emitted through the light exit plane 30a of the light guide plate 30.

For example, the optical members may also be formed of transmittance adjusting members each comprising a number of transmittance adjusters consisting of diffusion reflectors distributed according to the brightness unevenness in addition to or in place of the diffusion sheets and the prism sheet described above. Further, the optical member unit may be adapted to have two layers formed using one sheet each of the prism sheet and the diffusion sheet or two diffusion sheets only.

Now, the reflection plate 34 forming part of the main body of the lighting device will be described.

The reflection plate 34 is provided to reflect light leaking through the first inclined plane 30b and the second inclined plane 30c of the light guide plate 30 back into the light guide plate 30 and helps enhance the light use efficiency. The reflection plate 34 is shaped according to the contour of the first inclined plane 30b and the second inclined plane 30c of the light guide plate 30 to cover the first inclined plane 30b and the second inclined plane 30c. In the embodiment under discussion, the reflection plate 34 is shaped to contour the sectionally triangular shape formed by the first inclined plane 30b and the second inclined plane 30c as illustrated in FIG. 2.

The reflection plate 34 may be formed of any material as desired, provided that it is capable of reflecting light leaking through the inclined planes of the light guide plate 30. The reflection plate 34 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

Upper light guide reflection plates 36 are disposed between the light guide plate 30 and the diffusion sheet 32a, i.e., on the side of the light guide plate 30 closer to the light exit plane 30a, covering the main light sources 28 and the end portions of the light exit plane 30a, i.e., the end portion thereof closer to the first light entrance plane 30d and the end portion thereof closer to the second light entrance plane 30e. Thus, the upper light guide reflection plates 36 are disposed to cover an area extending from part of the light exit plane 30a of the light guide plate 30 to part of the array bases 54 of the main light sources 28 in a direction parallel to the direction of the optical axis. Briefly, two upper light guide reflection plates 36 are disposed respectively on both end portions of the light guide plate 30.

The upper light guide reflection plates 36 thus provided prevents light emitted by the main light sources 28 from leaking toward the light exit plane 30a instead of entering the light guide plate 30.

Thus, light emitted from the LED chips 50 of the main light sources 28 is efficiently admitted through the first light entrance plane 30d and the second light entrance plane 30e of the light guide plate 30, increasing the light use efficiency.

The lower light guide reflection plates 38 are disposed on the side of the light guide plate 30 opposite from the light exit plane 30a, i.e., on the same side as the first inclined plane 30b and the second inclined plane 30c, covering part of the main light sources 28. The ends of the lower light guide reflection plates 38 closer to the center of the light guide plate 30 are connected to the reflection plate 34.

The upper light guide reflection plates 36 and the lower light guide reflection plates 38 may be formed of any of the above-mentioned materials used to form the reflection plate 34.

The lower light guide reflection plates 38 prevent light emitted by the light sources 28 from leaking toward the first inclined plane 30b and the second inclined plane 30c of the light guide plate 30 instead of entering the light guide plate 30.

Thus, light emitted from the LED chips 50 of the main light sources 28 is efficiently admitted through the first light entrance plane 30d and the second light entrance plane 30e of the light guide plate 30, increasing the light use efficiency.

While the reflection plate 34 is connected to the lower light guide reflection plates 38 in the embodiment under discussion, their configuration is not so limited; they may be formed of separate materials.

The shapes and the widths of the upper light guide reflection plates 36 and the lower light guide reflection plates 38 are not limited specifically, provided that light emitted by the main light sources 28 is reflected and directed toward the first light entrance plane 30d or the second light entrance plane 30e such that light emitted by the main light sources 28 can be admitted through the first light entrance plane 30d or the second light entrance plane 30e and then guided toward the center of the light guide plate 30.

While, in the embodiment under discussion, the upper light guide reflection plates 36 are disposed between the light guide plate 30 and the diffusion sheet 32a, the location of the upper light guide reflection plates 36 is not so limited; it may be disposed between the sheets constituting the optical member unit 32 or between the optical member unit 32 and the upper housing 44.

Next, the housing 26 will be described.

As illustrated in FIG. 2, the housing 26 accommodates and secures therein the main body of the lighting device 24 by holding it from above and both sides thereof, i.e., the light emission plane 24a and the first inclined plane 30b and the second inclined plane 30c. The housing 26 comprises the lower housing 42, the upper housing 44, the turnup members 46, and the support members 48.

The lower housing 42 is open at the top and has a configuration comprising a bottom section and lateral sections provided upright on the four sides of the bottom section. Briefly, it has substantially the shape of a rectangular box open on one side. As illustrated in FIG. 2, the bottom section and the lateral sections support the main body of the lighting device 24 placed therein from above on the underside and on the lateral sides and covers the faces of the main body of the lighting device 24 except the light emission plane 24a, i.e., the plane opposite from the light emission plane 24a of the main body of the lighting device 24 (rear side) and the lateral sections.

The upper housing 44 has the shape of a rectangular box; it has an opening at the top smaller than the rectangular light emission plane 24a of the main body of the lighting device 24 and is open on the bottom side.

As illustrated in FIG. 2, the upper housing 44 is placed from above the main body of the lighting device 24 and the lower housing 42, that is, from the light exit plane side, to cover the main body of the lighting device 24 and the lower housing 42, which holds the former, as well as four lateral sections 22b.

The turnup members 46 each have a substantially U-shaped sectional profile that is identical throughout their length. That is, each turnup member 46 is a bar-shaped member having a U-shaped profile in cross section perpendicular to the direction in which it extends.

As illustrated in FIG. 2, the turnup members 46 are fitted between the lateral sections of the lower housing 42 and the lateral sections of the upper housing 44 such that the outer face of one of the parallel sections of said U shape connects with lateral sections 22b of the lower housing 42 whereas the outer face of the other parallel section connects with the lateral sections of the upper housing 44.

To connect the lower housing 42 with the turnup members 46 and the turnup members 46 with the upper housing 44, any known method may be used such as a method using bolts and nuts and a method using bonds.

Thus providing the turnup members 46 between the lower housing 42 and the upper housing 44 increases the rigidity of the housing 26 and prevents the light guide plate 30 from warping. As a result, for example, light can be efficiently emitted without, or with a greatly reduced level of, brightness unevenness. Further, even where the light guide plate used is liable to develop a warp, the warp can be corrected with an increased certainty or the warping of the light guide plate can be prevented with an increased certainty, thereby allowing light to be emitted through the light exit plane without brightness unevenness or with a greatly reduced level of brightness unevenness.

The upper housing, the lower housing and the turnup members of the housing may be formed of various materials including metals and resins but lightweight, high-rigidity materials are preferable.

While the turnup members are discretely provided in the embodiment under discussion, they may be integrated with the upper housing or the lower housing. Alternatively, the configuration may be formed without the turnup members.

The support members 48 have an identical profile in cross section perpendicular to the direction in which they extend throughout their length. That is, each support member 48 is a bar-shaped member having an identical cross section perpendicular to the direction in which it extends.

As illustrated in FIG. 2, the support members 48 are provided between the reflection plate 34 and the lower housing 42, more specifically, between the reflection plate 34 and the lower housing 42 close to the end of the first inclined plane 30b of the light guide plate 30 on which the first light entrance plane 30d is located and close to the end of the second inclined plane 30c of the light guide plate 30 on which the second light entrance plane 30e is provided. The support members 48 thus secure the light guide plate 30 and the reflection plate 34 to the lower housing 42 and support them.

With the support members 48 supporting the reflection plate 34, the light guide plate 30 and the reflection plate 34 can be brought into a close contact. Furthermore, the light guide plate 30 and the reflection plate 34 can be secured to a given position of the lower housing 42.

While the support members 48 are discretely provided in the embodiment under discussion, the invention is not limited thereto; they may be integrated with the lower housing 42 or the reflection plate 34. To be more specific, the lower housing 42 may be adapted to have projections to serve as support members or the reflection plate 34 may be adapted to have projections to serve as support members.

The locations of the support members 48 are also not limited specifically and they may be located anywhere between the reflection plate 34 and the lower housing 42. To stably hold the light guide plate 30, the support members 48 are preferably located closer to the ends of the light guide plate 30 or, in the embodiment under discussion, near the first light entrance plane 30d and the second light entrance plane 30e.

The support members 48 may be given various shapes and formed of various materials without specific limitations. For example, two or more of the support members 48 may be provided at given intervals.

Further, the support members 48 may have such a shape as to fill the space formed by the reflection plate 34 and the lower housing 42. Specifically, the support members 48 may have a shape such that the side thereof facing the reflection plate 34 has a contour following the surface of the reflection plate 34, and the side thereof facing the lower housing 42 has a contour following the surface of the lower housing 42. Where the support members 48 are adapted to support the whole surface of the reflection plate 34, separation of the light guide plate 30 and the reflection plate 34 can be reliably prevented and, further, generation of brightness unevenness that might otherwise be caused by light reflected by the reflection plate 34 can be prevented.

Now, a second embodiment of the invention will be described. The planar lighting device according to the second embodiment further comprises auxiliary light sources 29 in addition to the configuration of the first embodiment. The two planes, which are the first lateral plane 30f and the second lateral plane 30g in the first embodiment, are a first auxiliary light entrance plane 30h and a second auxiliary light entrance plane 30i (second light entrance planes) for admitting light from the auxiliary light sources 29 in the second embodiment. Thus, the planar lighting device according to the second embodiment is adapted to admit light through the four sides of the light guide plate. The other features of the configuration are identical to those of the first embodiment and hence detailed description thereof is not given here.

Figure 9A:
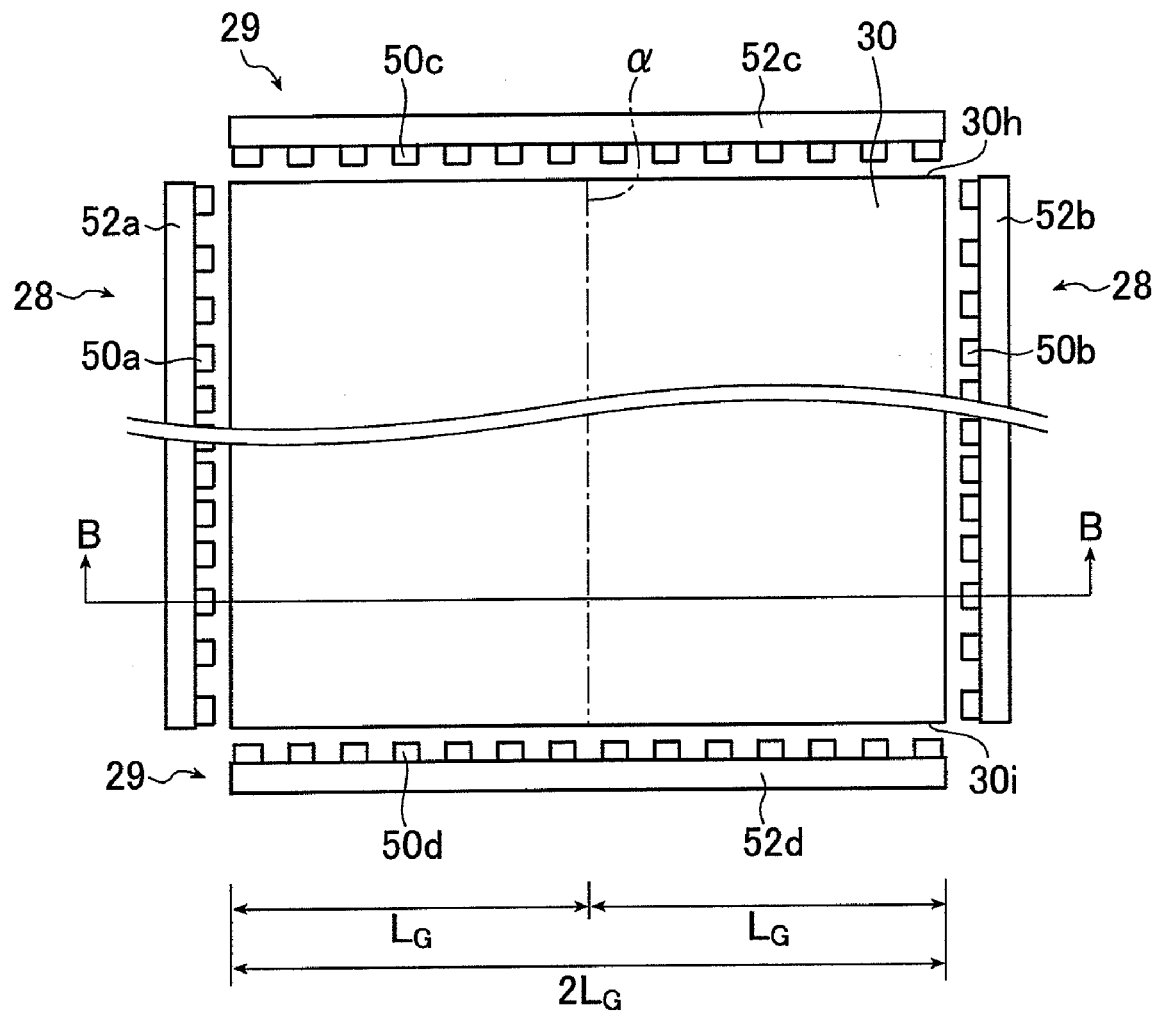
FIG. 9A is a view of another example of the planar lighting device illustrated in FIG. 2 taken along line III-III.
Figure 9B:
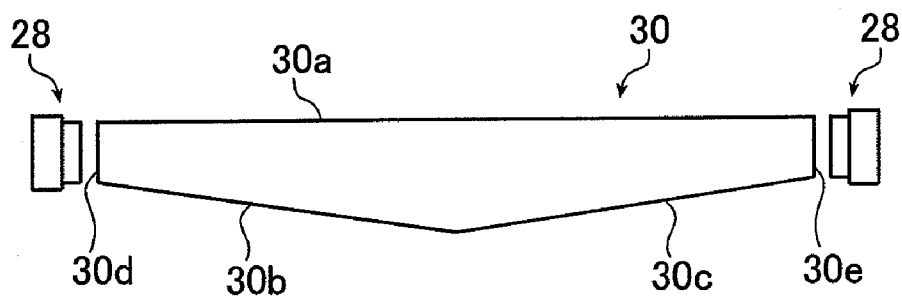
FIG. 9B is a cross sectional view of FIG. 9A taken along line B-B.

The main body of the lighting device 24 according to the second embodiment comprises two auxiliary light sources 29 as illustrated in FIGS. 9A and 9B in addition to the configuration of FIGS. 3A and 3B shared by the first embodiment.

The auxiliary light sources 29 have basically the same configuration as the main light sources 28 described earlier in the first embodiment except for their position with respect to the light guide plate 30 and the array density of the LED chips.

The two auxiliary light sources 29 are disposed respectively opposite the first auxiliary light entrance plane 30h and the second auxiliary light entrance plane 30i. Specifically, one of the auxiliary light sources 29 configured by LED chips 50c and a light source mount 52c is disposed opposite the first auxiliary light entrance plane 30h and the other auxiliary light source 29 configured by LED chips 50d and a light source mount 52d is disposed opposite the second auxiliary light entrance plane 30i.

In the auxiliary light sources 29, the LED chips 50 have a constant array density throughout the length of each auxiliary light source.

As described above, the planar lighting device according to the second embodiment has the auxiliary light sources disposed respectively opposite the first auxiliary light entrance plane 30h and the second auxiliary light entrance plane 30i. With light thus admitted also through the lateral sides of the light guide plate 30, the planar lighting device is capable of emitting an increased amount of light with an increased brightness through the light exit plane 30a. Accordingly, a large amount of illumination light can be emitted through the light exit plane, which enables an enlarged light exit plane to be achieved, securing a larger display area for liquid crystal display devices.

The planar lighting device 20 is basically configured as described above.

In the planar lighting device 20, light emitted by the main light sources 28 provided on both sides of the light guide plate 30 strikes the light entrance planes, i.e., the first light entrance plane 30d and the second light entrance plane 30e, of the light guide plate 30 while light emitted by the auxiliary light sources 29 provided on the other two sides of the light guide plate 30 strikes the lateral planes, i.e., the first auxiliary light entrance plane 30h and the second auxiliary light entrance plane 30i. Then, the light admitted through the respective planes is scattered by scatterers contained inside the light guide plate 30 as will be described later in detail as the light travels through the inside of the light guide plate 30 and, directly or after being reflected by the first inclined plane 30b and/or the second inclined plane 30c, exits through the light exit plane 30a. In the process, part of the light leaking through the first inclined plane 30b and the second inclined plane 30c is reflected by the reflection plate 34 to enter the light guide plate 30 again.

Thus, light emitted through the light exit plane 30a of the light guide plate 30 is transmitted through the optical member 32 and emitted through the light emission plane 24a of the main body of the lighting device 24 to illuminate the liquid crystal display panel 12.

The liquid crystal display panel 12 uses the drive unit 14 to control the transmittance of the light according to the position so as to display characters, figures, images, etc. on its surface.

The illuminance distribution of light emitted through the light exit plane was measured using the inventive planar lighting device.

In the example used for the measurement, the light guide plate had a shape as defined by the following dimensions: the length from the first auxiliary light entrance plane 30h to the second auxiliary light entrance plane 30i measured 1000 mm; a length "d" of the first light entrance plane 30d and the second light entrance plane 30e in the direction perpendicular to the light exit plane measured 580 mm; the length from the light exit plane 30a to the center of the rear planes at the bisector α, or, a maximum thickness D, measured 3.5 mm; and a length $L_G$ from the first light entrance plane 30d or the second light entrance plane 30e to the bisector α measured 290 mm.

The weight ratio of the scattering particles mixed into the light guide plate to the light guide plate was 0.07 Wt %.

FIG. 10 illustrates illuminance distribution of light emitted through the light exit plane 30a of the planar lighting device provided with the light guide plate 30 having the above configuration where the illuminance distribution illustrated was measured along the middle of the light guide plate and parallel to the first light entrance plane 30d and the second light entrance plane 30e, i.e., on the bisector α.

FIG. 10 indicates relative illuminance [lx] on the vertical axis plotted against the position [mm] in the longitudinal direction of the first light entrance plane 30d and the second light entrance plane 30e of the light guide plate 30 given on the horizontal axis. The position "0" on the horizontal axis indicates the center of the light guide plate 30 in the longitudinal direction of the first light entrance plane 30d and the second light entrance plane 30e; the positions "−500" and "500" indicate both ends of the light guide plate 30 in the longitudinal direction of the first light entrance plane 30d and the second light entrance plane 30e.

With the liquid crystal display device 10, provided with the main light sources 28 and the auxiliary light sources 29 as in the embodiment under discussion, the absolute value of the illuminance of light emitted through the light exit plane 30a can be improved and the amount of overall light provided by the liquid crystal display device 10 can be increased.

Further, according to the light guide plate 30 used in the embodiment under discussion, the absolute value of the illuminance improves by a factor of about 1.5 where the main light sources 28 and the auxiliary light sources 29 are provided as compared with the case where only the main light sources 28 are provided.

Thus, the configuration where the light guide plate has the light sources provided on all the four sides thereof allows a large amount of illumination light to be emitted through the light exit plane, thereby achieving a larger display area for the device in which the light guide plate is used.

In the present invention, the LED chips 50a and 50b on the main light sources 28 are preferably arranged at an array density varying according to the position in the longitudinal direction of the first light entrance plane 30d and the second light entrance plane 30e opposite which these LED chips are disposed.

Figure 11:
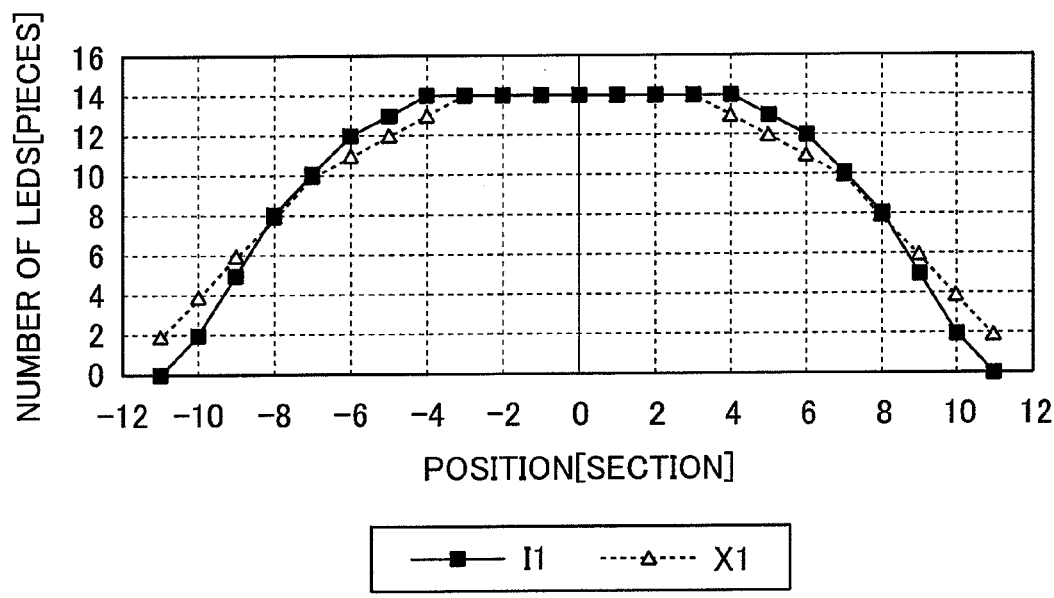
FIG. 11 is a graph illustrating an array density of LED chips in a direction parallel to the longitudinal direction of the light entrance planes.

FIG. 11 illustrates an array density of the LED chips 50 varying according to the position in the longitudinal direction of the first light entrance plane 30d and the second light entrance plane 30e.

FIG. 11 is a graph of the LED chip distribution illustrating the array density of the LED chips 50a and 50b along the length of the main light sources 28 of the inventive planar lighting device 10.

FIG. 11 indicates on the horizontal axis the positions [sections] on the light guide plate 30 each having a given unit length, which is 4 mm in the embodiment under discussion, into which the longitudinal length of the first light guide plate 30d and the second light guide plate 30e is divided, plotted against the number of LED chips [pieces] arranged in each section having a given unit length on the vertical axis. The section "0" on the horizontal axis indicates the 4-mm range containing the center of the light guide plate 30 in the longitudinal direction of the first light entrance plane 30d and the second light entrance plane 30e; the sections "−12" and "12" indicate the outermost ranges between each of the outermost ends of the light guide plate 30 and a point 4 mm from said end toward the center in the longitudinal direction of the first light entrance plane 30d and the second light entrance plane 30e.

The example under discussion uses two different array density patterns, I1 and X1, to array the LED chips 50 as illustrated in FIG. 11.

In the example under discussion, the LED chips 50 are arranged at a density of 14 pieces per section (4-mm range) in the array density patterns I1 and X1 in the positions opposite the central area of the first light entrance plane 30d and the second light entrance plane 30e of the light guide plate 30, i.e., the position "0" on the horizontal axis, as illustrated in FIG. 11. The array density of the LED chips 50 decreases with the increasing distance from the center of the first light entrance plane 30d and the second light entrance plane 30e toward both ends thereof such that the number of LED chips 50 per section is 0 in the positions "−11" and "11" in the case of array density pattern I1 and in the positions "−12" and "12" in the case of array density pattern X1, i.e., the positions opposite both ends of the first light entrance plane 30d and the second light entrance plane 30e.

In both patterns I1 and X1, the array density peaks adjacent the central area of the first light entrance plane 30d and the second light entrance plane 30e, i.e., adjacent the position "0" on the horizontal axis in FIG. 11. Now, let the array density be 1 at the center, then the LED chips 50 are arrayed at an array density D satisfying $0 < D \leq 1$ in any other position.

Figure 12:
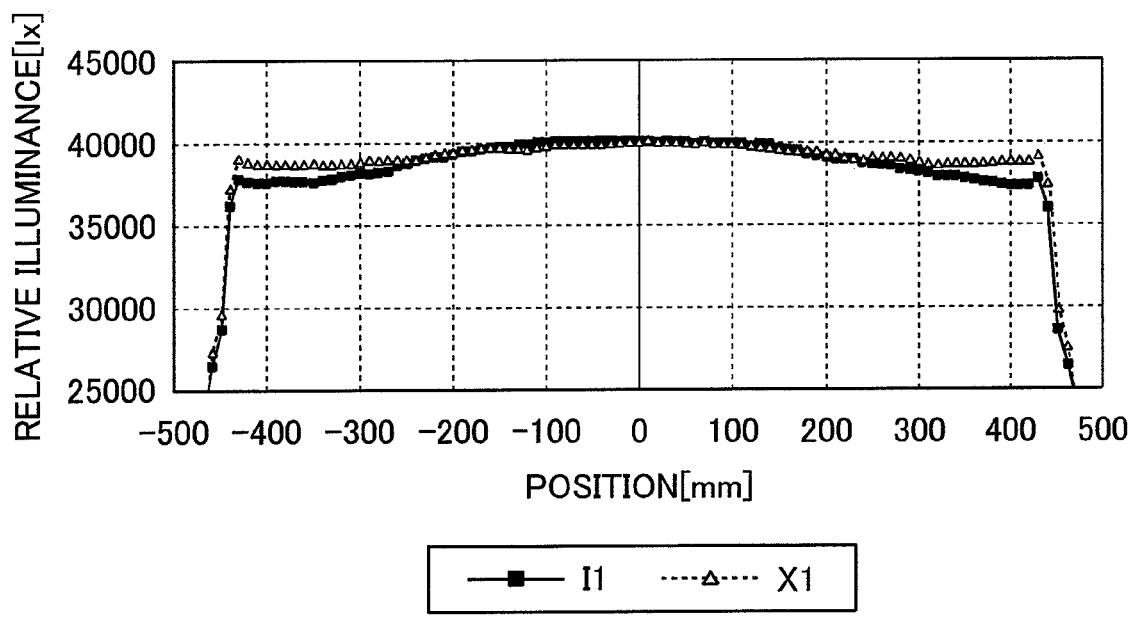
FIG. 12 is a graph illustrating an illuminance distribution obtained using the LED chips arranged at the array density of FIG. 11 as measured in a direction along the middle of the light guide plate and parallel to the light entrance planes.
Figure 13:
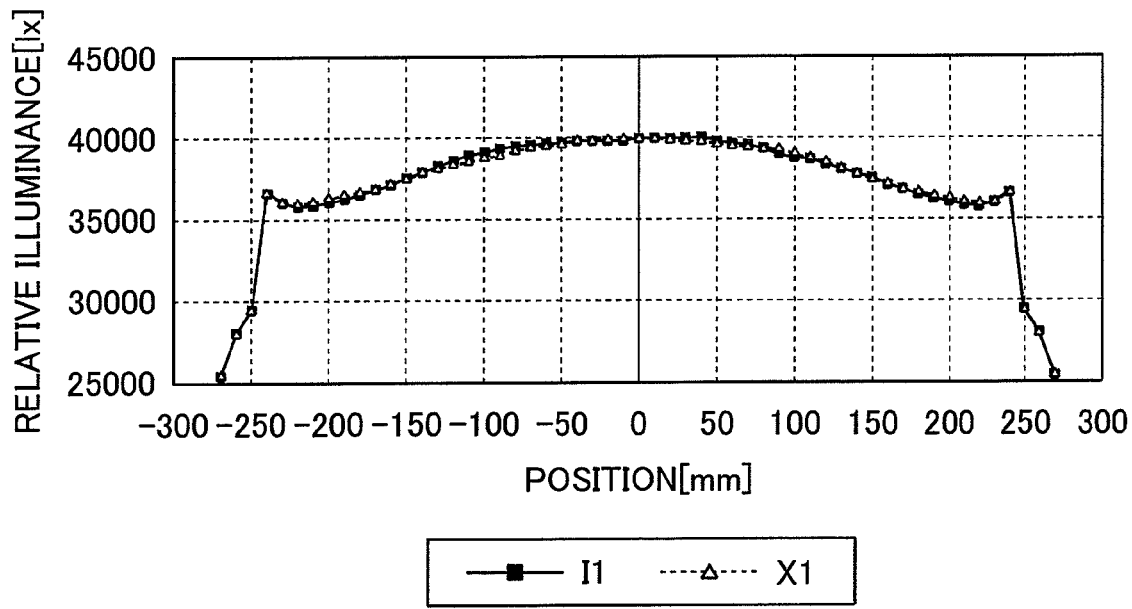
FIG. 13 is a graph illustrating a illuminance distribution obtained using the LED chips arranged at the array density of FIG. 11 as measured along the middle of the light guide plate and parallel to the lateral planes thereof.

FIGS. 12 and 13 illustrate illuminance distributions obtained using the light guide plate 30 where the LED chips are arrayed at the density given in FIG. 11.

FIG. 12 illustrates illuminance distributions of the light as measured on the light exit plane 30a along the middle of the light guide plate 30 and parallel to the longitudinal direction of the first light entrance plane 30d and the second light entrance plane 30e. In this case, the LED chips 50 were arranged at the array density patterns I1 and X1 of FIG. 11. FIG. 12 indicates the relative illuminance [lx] on the vertical axis plotted against the position [mm] in the longitudinal direction of the first light entrance plane 30d and the second light entrance plane 30e of the light guide plate 30 on the horizontal axis.

As illustrated in FIG. 12, whether the array density pattern I1 or X1 is used, the illuminance peaks adjacent the central area, i.e., adjacent the position "0" on the horizontal axis and decreases down the periphery toward both ends, representing a bell-curve illuminance distribution.

FIG. 13 illustrates an illuminance distribution of light on the light exit plane 30a along the middle of the light guide plate 30 and parallel to the longitudinal direction of the first auxiliary light entrance plane 30h and the second auxiliary light entrance plane 30i. Note that in the example under discussion, the array density of the LED chips 50 is constant throughout the length of the auxiliary light sources 29.

FIG. 13 indicates the relative illuminance [lx] on the vertical axis plotted against the position [mm] in the longitudinal direction of the first auxiliary light entrance plane 30h and the second auxiliary light entrance plane 30i on the horizontal axis.

As is apparent from FIG. 13, the illuminance distribution along the length of the first auxiliary light entrance plane 30h and the second auxiliary light entrance plane 30i represents a bell curve distribution where the illuminance peaks at the center, i.e., adjacent the position "0" on the horizontal axis, decreasing with the increasing distance from the center toward both ends, almost regardless of whether the LED chips 50 on the main light sources 28 are arrayed at the array density pattern I1 or X1.

It follows, therefore, that where the LED chips 50 are provided on the main light sources 28 with such array densities as illustrated in FIG. 11, illuminance distributions as illustrated in FIGS. 12 and 13 can be obtained where the illuminance adjacent the central area of the light exit plane 30a is higher than in the periphery thereof, representing a high-in-the-middle, bell-curve illuminance distribution.

Now, let Npi be the density of scattering particles in regions of space Ri within a given range of the light guide plate from the light entrance planes toward the center of the light guide plate and Np the density of scattering particles in the other region of space Rt in the light guide plate. Then, it is preferable that Npi>Np holds. When this condition is met, uneven brightness in areas close to the light entrance planes can be suppressed while maintaining the illuminance distribution (brightness distribution) of the light emitted through the light exit plane in the form of a bell curve (high-in-the-middle distribution) even where a large light guide plate is used.

Further, the density of scattering particles Npi is preferably in a range of 0.02 wt %<Npi<0.25 wt %. This range of particle density involves little sacrifice of the light use efficiency.

A length Lnpi of each region of space Ri to which the density of scattering particles Npi is applied preferably lies in a region of 5 mm<Lnpi<20 mm from either light entrance plane toward the center of the light guide plate. In order not to affect the brightness distribution of the light emitted through the light exit plane 30a, the region of space Lnpi needs to lie within the width of the frame defined by the upper housing 44 that is provided in such a manner as to cover the periphery of the light exit plane 30a of the light guide plate 30 on the four sides thereof. The above range of the region of space is a range set considering the provision of the frame defined by the upper housing 44.

Further, the region of space Lnpi preferably satisfies a relationship Lnpi<Lr<Le, where Lr is the length of the upper light guide reflection plates 36 (reflection members provided on the side opposite from the light exit plane 30a) in the direction in which light is admitted, and Le the width of the frame of the upper housing 44. Limiting the region of space Lnpi to within the frame defined by the upper housing 44 and, moreover, within the length of Lr of the upper light guide reflection plates 36 prevents recognition of the difference in density between the region within a given range of the light guide plate from either light entrance plane toward the center of the light guide plate and the other region in the light guide plate.

While, in the first and the second embodiments described above, the LED chip array density is varied according to where the LED chips are located with respect to the opposite light entrance plane in order to achieve the bell-curve illuminance distribution on the light exit plane, the present invention is not limited thereto; the array density of the LED chips in the first and the second examples may be constant in any position throughout the length of the light source, and the amount of light at the light source may instead be adjusted to achieve like effects. That is, the LED chips may be adapted to produce different amounts of light in order to achieve the illuminance distributions as illustrated in FIGS. 12 and 13.

In the embodiment under discussion, the LED chips 50 are independently set to their respective amounts of light such that the amount of light produced is greatest adjacent the central area in the longitudinal direction of the first light entrance plane 30d and the second light entrance plane 30e, decreasing with the increasing distance from the center toward both ends.

The LED chips 50 are preferably set to their respective amounts of light such that the illuminance of light as measured along the bisector α of the light guide plate 30 represents a high-in-the-middle, bell-curve distribution. Specifically, suppose that the amount of light of the LED chips opposite the central area of the first light entrance plane 30d and the second light entrance plane 30e is 1, then the LED chips 50 are set to their respective amounts of light such that an amount of light I satisfies 0<I≦1 in any other position.

Thus independently setting the LED chips 50 to their respective amounts of light allows the same effects to be produced as where the array density of the LED chips 50 is adjusted, achieving a bell-curve illuminance distribution with the light guide plate 30 as illustrated in FIGS. 12 and 13.

To calculate the amounts of light to be produced by the LED chips 50 to achieve the bell-curve illuminance distribution, any known method may be used such as a sequential iteration method.

Preferably, in the second embodiment described above, the LED chips 50 provided on the auxiliary light sources 29 are also independently set to their respective amounts of light as are those on the major light sources 28. Thus, different illuminances can be set in different areas as designated in the light exit plane 30a. In other words, the amount of light can be set two-dimensionally in the light exit plane 30a. Accordingly, an area control is made possible whereby the brightness in the light exit plane can be adjusted from area to area.

Further, in the embodiment under discussion, let D1 be the thickness of the light guide plate at its light entrance plane (thickness of the light guide plate at a location at which light is admitted); D2 the thickness of the light guide plate at a location where the light guide plate is thickest, which, in the embodiment under discussion, is the thickness of the light guide plate where the bisector α thereof is located (thickness at the center); and L the length of the light guide plate in the incident direction from the first light entrance plane to the second light entrance plane (light guiding length), L being $2L_G$ in the embodiment under discussion. Then, it is preferable that the following relationships hold:

D1<D2 and $$27/100000 < (D2-D1)/(L/2) < 5/100 \qquad \text{(A); and}$$

that the ratio Npa of the weight of the scattering particles contained to the weight of the light guide plate satisfies a range:

0.04 Wt %<Npa<0.25 Wt %.

When the above relationships are satisfied, the light emission efficiency of the main light sources can be increased to 30% or more.

Alternatively, it is preferable that the light guide plate is improved such that the following relationships hold:

D1<D2 and $$66/100000 < (D2-D1)/(L/2) < 26/1000 \qquad \text{(B); and}$$

that the ratio Npa of the weight of the contained scattering particles to the weight of the light guide plate satisfies a range:

0.04 Wt %<Npa<0.25 Wt %.

When the above relationships are satisfied, the light emission efficiency of the main light sources can be increased to 40% or more.

It is preferable that the light guide plate is improved such that the following relationships hold:

D1<D2 and $$1/1000 < (D2-D1)/(L/2) < 26/1000 \qquad \text{(C); and}$$

that the ratio Npa of the weight of the contained scattering particles to the weight of the light guide plate satisfies a range of:

0.04 Wt %<Npa<0.25 Wt %.

When the above relationships are satisfied, the light emission efficiency can be increased to 50% or more.

Figure 14:
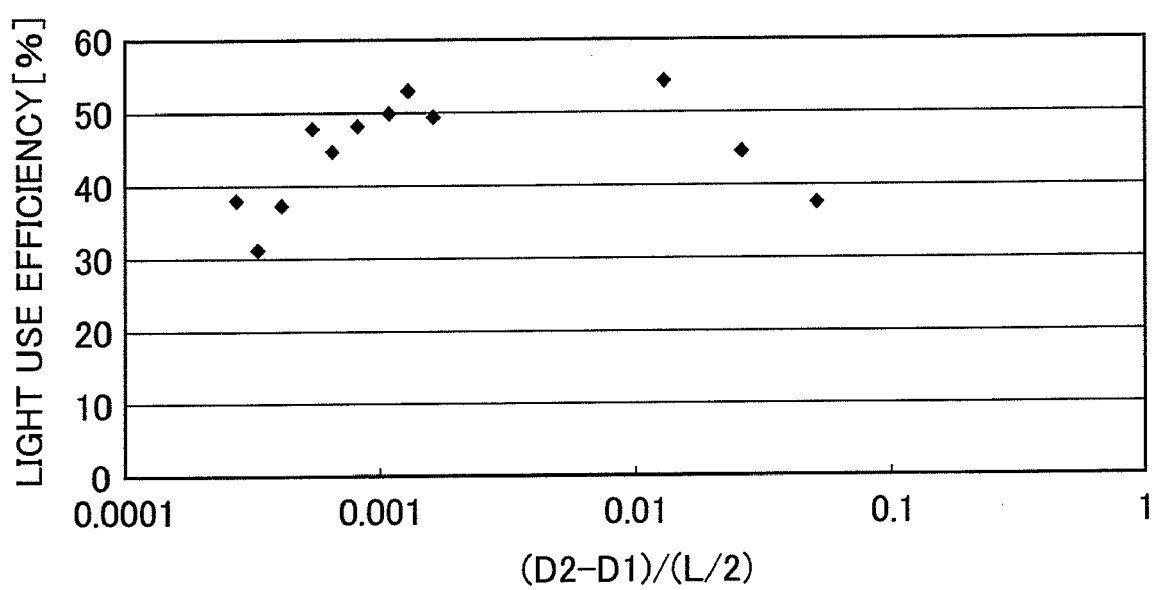
FIG. 14 is a graph illustrating measurements of light use efficiency obtained using light guide plates having different configurations.

FIG. 14 illustrates measurements of the light use efficiency of light guide plates of which the inclined planes have different inclination angles from each other, i.e., light guide plates having various shapes with different values (D2−D1)/(L/2).

Because the light guide plates according to the example used for the measurements have a flat shape in the direction in which light emitted by the auxiliary light sources travels and, therefore, light use efficiency does not substantially vary with the shape of the inclined planes, only the main light sources were provided to measure the light use efficiency thereof.

FIG. 14 indicates (D2−D1)/(L/2) of the light guide plate on the horizontal axis plotted against light use efficiency [%] on the vertical axis.

As will be apparent from the measurements illustrated in FIG. 14, when the light guide plate has a shape satisfying 27/100000<(D2−D1)/(L/2)<5/100, the light use efficiency can be increased to 30% or more; when the light guide plate has a shape satisfying 66/100000<(D2−D1)/(L/2)<26/1000, the light use efficiency can be increased to 40% or more; and when the light guide plate has a shape satisfying 1/1000<(D2−D1)/(L/2)<26/1000, the light use efficiency can be increased to 50% or more.

The light guide plate may have any shape without limitation to the above shape, provided that the thickness of the light guide plate increases with the increasing distance from the light entrance plane.

For example, prism arrays may be formed on the first inclined plane 30b and the second inclined plane 30c in the direction parallel to the first light entrance plane 30d and the second light entrance plane 30e. Instead of such prism arrays, optical elements similar to prisms may be provided and arranged regularly. For example, elements having lens effects such as lenticular lenses, concave lenses, convex lenses, or optical elements in pyramidal shape may be formed on the inclined planes of the light guide plate.

In the embodiment under discussion, the light exit plane 30a of the light guide plate 30 has the longer sides adjacent the light entrance planes and the shorter sides adjacent the lateral planes in order to emit light through the light exit plane with an enhanced brightness and efficiency. The invention, however, is not limited to such a configuration; the light exit plane may be formed into a square; or the sides thereof adjacent the light entrance planes may be the shorter sides and the sides thereof adjacent the lateral planes may be the longer sides.

Further, the light entrance planes 30d and 30e and the lateral planes 30f and 30g or the light entrance planes 30h and 30i need not necessarily be provided in such a manner as to be substantially vertical to the sides of the light exit plane 30a.

The joint between the first inclined plane and the second inclined plane of the light guide plate preferably has a rounded shape. Where the joint between the first inclined plane and the second inclined plane of the light guide plate has a rounded shape connecting the two planes smoothly, generation of brightness unevenness observed in the form of, for example, a bright line on the line of intersection between the first inclined plane and the second inclined plane can be prevented.

Figure 15A:
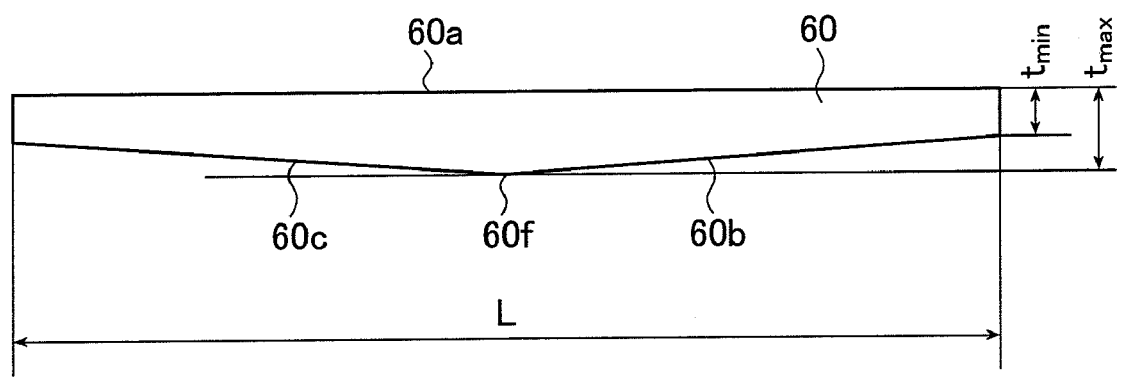
FIG. 15A is a schematic sectional view illustrating another example of the light guide plate.
Figure 15B:
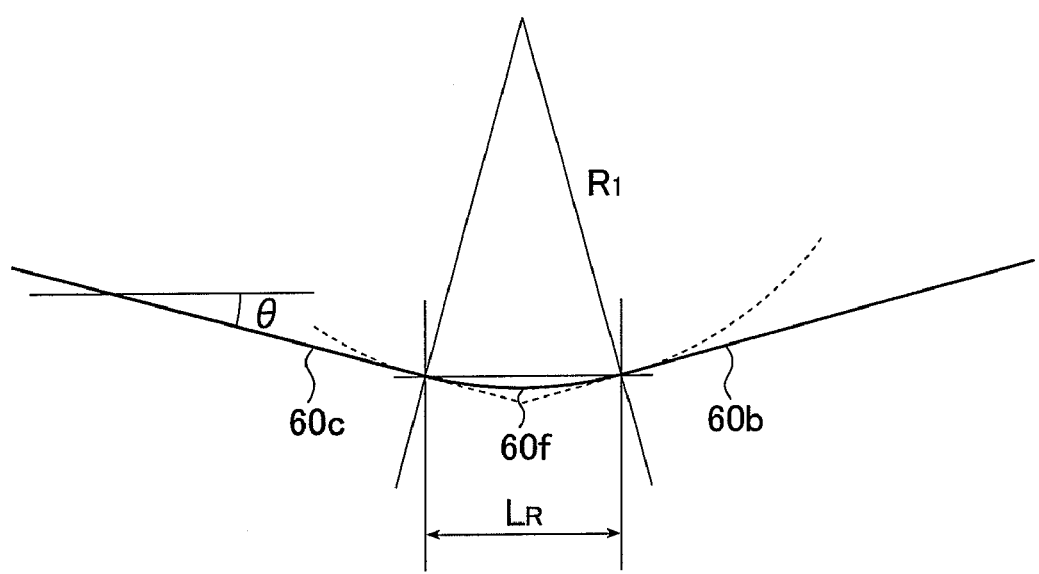
FIG. 15B is a schematic sectional view illustrating enlarged part of a configuration including the joint joining the inclined planes of the light guide plate of FIG. 15A

FIG. 15A is a schematic sectional view illustrating another example of the light guide plate; FIG. 15B is a schematic sectional view illustrating a part near the joint of the inclined planes of the light guide plate of FIG. 15A as enlarged.

The light guide plate 60 illustrated in FIGS. 15A and 15B is an example where the light guide plate has a given range of a curved configuration from a joint 60f between a first inclined plane 60b and a second inclined plane 60c (the center of the rear planes) in the direction of the light entrance planes for a smooth connection. The other part than the curved configuration is flat.

The area neighboring the joint 60f joining the inclined planes 60b and 60c of the light guide plate 60, given a rounded configuration, prevents occurrence of bright lines or dark lines at the joint 60f between the first inclined plane 60b and the second inclined plane 60c, and enables emission of light through the light exit plane 60a with an increased uniformity.

Where the area neighboring the joint 60f joining the inclined planes 60b and 60c of the light guide plate 60 is given a rounded configuration, the relationship between the radius of curvature $R_1$, which is a radius of curvature of the rounded configuration, and the length L of the light guide plate between the light entrance planes preferably satisfies $3L \leq R_1 \leq 500L$.

Further, $2R_1 \cdot \sin(\theta) \leq L_R$ preferably holds, where $L_R$ is the length from one end of the rounded configuration to the other in the direction in which light is admitted, and $\theta$ is the angle formed by a plane parallel to a light exit plane 60a and the first inclined plane 60b (or the second inclined plane 60c). Where $L_R$ is not smaller than $2R_1 \cdot \sin(\theta) \leq L_R$, the decrease in brightness in a central area of the light exit plane 60a can be prevented, and light with an increased uniformity can be emitted through the light exit plane 60a.

Further, the light guide plate preferably has a shape satisfying $3L \leq R_1 \leq 500L$ and $2R_1 \cdot \sin(\theta) \leq L_R \leq 0.98L$.

The angle $\theta$ can be represented by the following expression (5) using a maximum thickness $t_{max}$ of the light guide plate 60, a minimum thickness $t_{min}$, and the length L of the light guide plate between the light entrance planes.

$$\theta = \tan^{-1}\left[\frac{t_{max} - t_{min}}{L/2}\right] \quad (5)$$

While, in the above embodiment, the inclined planes of the light guide plate are defined by a straight line in cross section, the shape of the first inclined plane and the second inclined plane, i.e., the underside of the light guide plate, is not limited specifically. The first inclined plane and the second inclined plane may be defined by a curved surface or each of them may have two or more inclined sections. In other words, each inclined plane may have inclined sections each having different inclination angles according to their position. Further, the inclined planes may be curved outwardly or inwardly with respect to the light exit plane, or may have outwardly and inwardly curved sections combined.

The inclined planes preferably have a configuration such that their inclination angle with respect to the light exit plane decreases from the light entrance planes toward the center of the light guide plate or toward a position where the light guide plate is thickest. Where the inclination angle of the inclined planes gradually decreases, light having less brightness unevenness can be emitted through the light exit plane.

The inclined planes more preferably have an aspherical cross section that may be expressed by a 10-th order polynomial. Where the inclined planes have such a configuration, light having less brightness unevenness can be emitted regardless of the thickness of the light guide plate.

Further, the shape of the light guide plate is not limited to that of the embodiment under discussion; for example, the first inclined plane and the second inclined plane may have different inclinations from each other. Still further, the light guide plate may have a shape such that the distance between the first light entrance plane and the position where the light guide plate is thickest is different from the distance between the second light entrance plane and the position where the light guide plate is thickest. Described otherwise, the length of the first inclined plane in the direction of the optical axis may be different from that of the second inclined plane in the direction of the optical axis.

The light guide plate having such a shape is also capable of allowing light to travel a long distance from the light entrance planes, while keeping a thin design. This enables a reduced thickness of the light guide plate and a larger light exit plane to be achieved.

Again, with the light guide plate having the above shape, preferably the value $\Phi \cdot N_p \cdot L_G \cdot K_C$ is in the range of not less than 1.1 and not greater than 8.2, and $0.005 \leq K_C \leq 0.1$, where $L_G$ is the length in the incident direction from the light entrance plane to the position where the thickness of the light guide plate in the direction perpendicular to the light exit plane is thickest. When the above ranges are satisfied, light can be emitted through the light exit plane with a reduced illuminance unevenness and a high light use efficiency.

The light guide plate may be fabricated by mixing a plasticizer into a transparent resin.

Fabricating the light guide plate from a material thus prepared by mixing a transparent material and a plasticizer provides a flexible light guide plate, allowing the light guide plate to be deformed into various shapes. Accordingly, the surface of the light guide plate can be formed into various curved surfaces.

Where the light guide plate is given such flexibility, the light guide plate or the planar lighting device using the light guide plate can even be mounted to a wall having a curvature when used, for example, for a display board employing ornamental lighting (illuminations). Accordingly, the light guide plate can be used for a wider variety of applications and in a wider application range including ornamental lighting and POP (point-of-purchase) advertising.

Said plasticizer is exemplified by phthalic acid esters, or, specifically, dimethyl phthalate, diethyl phthalate (DEP), dibutyl phthalate (DBP), di(2-ethylhexyl) phthalate (DOP (DEHP)), di-n-octyl phthalate (DnOP), diisononyl phthalate (DINP), dinonyl phthalate (DNP), diisodecyl phthalate (DIDP), phthalate mixed-base ester ($C_6$ to $C_{11}$) (610P, 711P, etc.) and butyl benzyl phthalate (BBP). Besides phthalic acid esters, said plasticizer is also exemplified by dioctyl adipate (DOA), diisononyl adipate (DINA), dinormal alkyl adipate ($C_{6,8,10}$) (610A), dialkyl adipate ($C_{7,9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

While the inventive planar lighting device has been described above in detail, the invention is not limited in any manner to the above embodiment and various improvements and modifications may be made without departing from the spirit of the present invention.

For example, while each LED chip of the light sources is formed by applying YAG fluorescent substance to the light emission face of a blue LED, the LED chip may be formed otherwise without limitations to such a configuration. For example, the LED chip used herein may be formed using a different monochromatic LED such as a red LED or a green LED with a fluorescent substance.

Further, an LED unit formed using three kinds of LEDs, i.e., a red LED, a green LED, and a blue LED, may be used. In that case, light beams emitted by the three kinds of LEDs are blended to produce white light.

Alternatively, a semiconductor laser (LD) may be used instead of an LED.

Further, one may provide between the light guide plate and each of the light sources (main light sources and/or auxiliary light sources) a portion formed of a material having a refractive index close to that of the light guide plate. Alternatively, part of the light entrance planes and/or the lateral planes of the light guide plate may be formed of a material having a smaller refractive index than the other parts.

Where part of the light guide plate through which light emitted by the light source is admitted is adapted to have a smaller refractive index than the other parts, light emitted by the light source can be admitted more efficiently, and the light use efficiency can be further enhanced.

Further, two or more light guide plates may be juxtaposed by connecting their lateral planes to provide a single light exit plane formed by a plurality of light guide plates. In that case, the auxiliary light sources may be provided only on the outermost lateral planes of the outermost light guide plates.

In the embodiment under discussion, the auxiliary light sources are provided on the lateral sides of the light guide plate in order to further increase the brightness of the light emitted through the light exit plane and obtain a bell-curve distribution of the brightness as observed in the two mutually orthogonal directions. However, the invention is not limited to such a configuration; one may use a configuration, for example, whereby the auxiliary light sources are not provided and only the main light sources are provided to admit light through the light entrance planes.

What is claimed is:

1. A planar lighting device comprising:
a light guide plate including
a light exit plane,
a pair of first light entrance planes respectively formed on a pair of sides of said light exit plane,
a pair of lateral planes respectively formed on the other pair of sides of said light exit plane, and
a rear plane composed of a pair of inclined planes formed on a side opposite from said light exit plane and inclined such that a thickness of said light guide plate in a direction perpendicular to said light exit plane increases with an increasing distance from said pair of light entrance planes, respectively, and joining each other in a middle between said pair of first light entrance planes;
a pair of main light sources for emitting light to said pair of light entrance planes of said light guide plate, respectively, said pair of main light sources being disposed respectively opposite to said pair of light entrance planes; and,
reflection members, each provided so as to cover each of regions of said light exit plane within a given range from each of said pair of first light entrance planes toward the center of said light guide plate, for reflecting light admitted through said pair of first light entrance planes and leaking through said regions of said light exit plane covered by said reflection members back into said light guide plate;
wherein said light guide plate is formed by kneading and therein dispersing scattering particles for scattering light so as to satisfy Npi>Np, where Npi is a first density of said scattering particles in first regions of space within a given range of said light guide plate from said pair of first light entrance planes toward a center of said light guide plate and Np is a second density of said scattering particles in the other region of space in said light guide plate,
wherein a length Lnpi of each of said first regions of space to which said first density of said scattering particles Npi is applied satisfies a relationship Lnpi<Lr<Le, where Lr is a length of each of said reflection members in the direction in which light is admitted, and Le is a width of a frame of an upper housing provided in such a manner as to cover a periphery of said light exit plane of said light guide plate on four sides thereof.

2. The planar lighting device according to claim 1, wherein said first density of said scattering particles Npi is in a range of 0.02 wt %<Npi<0.25 wt %.

3. The planar lighting device according to claim 1, wherein the length Lnpi of each of said first regions of space to which said first density of said scattering particles Npi is applied lies in a range of region of 5 mm<Lnpi<20 mm from each of said pair of first light entrance planes toward the center of said light guide plate.

4. The planar lighting device according to claim 1, wherein each of said pair of main light sources comprises: a support member; and plural light sources arrayed respectively on said support member in a longitudinal direction of said pair of first light entrance planes, and wherein each of said plural light sources forming each of said pair of main light sources is an LED chips.

5. The planar lighting device according to claim 1, wherein said pair of lateral planes is a pair of second light entrance planes, and wherein said planar lighting device further comprises a pair of auxiliary light sources respectively disposed adjacent said pair of second light entrance planes, for emitting light allowed to admit through said pair of second light entrance planes, respectively.

6. The planar lighting device according to claim 5, wherein each of said pair of auxiliary light sources comprises: a support member; and plural light sources arrayed respectively on said support member in a longitudinal direction of said pair of second light entrance planes, and wherein each of said plural light sources forming each of said pair of said auxiliary light sources is an LED chips.

* * * * *